(12) United States Patent
Aksyuk et al.

(10) Patent No.: US 8,997,258 B2
(45) Date of Patent: Mar. 31, 2015

(54) MICROSCOPE PROBE AND METHOD FOR USE OF SAME

(71) Applicant: National Institute of Standards and Technology, Gaithersbrug, MD (US)

(72) Inventors: Vladimir Aksyuk, Gaithersburg, MD (US); Kartik Srinivasan, Silver Spring, MD (US); Houxun Miao, Bethesda, MD (US); Ivo W. Rangelow, Baunatal (DE); Thomas Michels, Dortmund (DE)

(73) Assignees: National Institute of Standards and Technology, Gaithersburg, MD (US); University of Maryland, College Park, College Park, MD (US)

( * ) Notice: Subject to any disclaimer, the term of this patent is extended or adjusted under 35 U.S.C. 154(b) by 0 days.

(21) Appl. No.: 14/286,480

(22) Filed: May 23, 2014

(65) Prior Publication Data

US 2014/0338074 A1 Nov. 13, 2014

Related U.S. Application Data

(60) Provisional application No. 61/826,667, filed on May 23, 2013.

(51) Int. Cl.
*G02B 6/26* (2006.01)
*G01B 9/02* (2006.01)
*G01B 11/24* (2006.01)
*G02F 1/035* (2006.01)
(Continued)

(52) U.S. Cl.
CPC ..................... *G01Q 20/02* (2013.01)
USPC ............... 850/6; 850/47; 385/12; 356/237.2; 356/239.7; 73/105; 73/579; 73/800

(58) Field of Classification Search
USPC ............... 850/1–3, 6, 21, 40, 47, 48, 52, 63; 385/1–3, 12, 13, 129–132, 146, 147; 356/2, 600, 601, 237.1, 237.2, 237.3, 356/239.3, 239.7; 73/43, 64, 105, 570, 579, 73/800; 359/241, 245, 247, 248, 302
See application file for complete search history.

(56) References Cited

U.S. PATENT DOCUMENTS 5,969,821 A 10/1999 Muramatsu et al.
6,970,623 B2 * 11/2005 Vernooy .................... 385/43
(Continued)

OTHER PUBLICATIONS

Wu et al., J. Lightwave, "Optical MEMS for Lightwave Communication," Tech. 24, 4433 (2006)
(Continued)

*Primary Examiner* — Bernard E Souw
(74) *Attorney, Agent, or Firm* — Toby D. Hain

(57) ABSTRACT

A microscope probe includes a substrate; an optical resonator disposed on the substrate and including an optical resonance property; a displacement member disposed on the substrate and separated from the optical resonator, the displacement member including: a first end disposed distal to the optical resonator; and a second end disposed proximate to the optical resonator; and a coupling member disposed on the substrate and connecting the displacement member to the substrate, wherein the first end is configured to probe a sample and to be displaced in response to a condition of the sample, the displacement member is configured to communicate displacement of the first end to the second end, and the second end is configured to change the optical resonance property in response to displacement of the second end.

20 Claims, 36 Drawing Sheets

(51) Int. Cl.
*G02F 1/025* (2006.01)
*G01Q 20/02* (2010.01)

(56) References Cited

U.S. PATENT DOCUMENTS

| | | | |
|---|---|---|---|
| 7,068,862 B2 | 6/2006 | Lim et al. | |
| 7,158,693 B2 | 1/2007 | Tran et al. | |
| 7,274,835 B2* | 9/2007 | Panepucci et al. | 385/12 |
| 7,903,906 B2* | 3/2011 | Smith et al. | 385/12 |
| 8,208,502 B2* | 6/2012 | Srinivasan et al. | 372/6 |
| 2005/0180678 A1* | 8/2005 | Panepucci et al. | 385/13 |
| 2006/0238206 A1 | 10/2006 | Eng et al. | |
| 2009/0310902 A1* | 12/2009 | Smith et al. | 385/12 |
| 2010/0085573 A1 | 4/2010 | Lu et al. | |
| 2014/0047585 A1* | 2/2014 | Hofrichter et al. | 850/56 |
| 2014/0338074 A1* | 11/2014 | Aksyuk et al. | 850/6 |

OTHER PUBLICATIONS

Srinivasan et al., "Optomechanical Transduction of an Integrated Silicon Cantilever Probe Using a Microdisk Resonator," Nano Lett. 11, 791 (2011).

Lin et al., "Mechanical Oscillation and Cooling Actuated by the Optical Gradient Force," PRL 103, 103601 (2009).

Liang et al., "Recent Progress in Lasers on Silicon," Nature Photonics 4, 512 (2010).

Burcham et al., "Micromachined Silicon Cantilever Beam Accelerometer Incorporating an Integrated Optical Waveguide," SPIE 1793, 13 (1992).

Abdullah et al., "Micro Bimorph Cantilever Switches for Tuning Integrated Optical Systems," In: The Sense of Contact 12, Apr. 8, 2010, Zeist, The Netherlands, available at http://doc.utwente.nl/75941/.

* cited by examiner

MICROSCOPE PROBE AND METHOD FOR USE OF SAME

CROSS REFERENCE TO RELATED APPLICATIONS

This application claims the benefit of U.S. Provisional Patent Application Ser. No. 61/826,667 filed May 23, 2013, the disclosure of which is incorporated herein by reference in its entirety.

STATEMENT REGARDING FEDERALLY SPONSORED RESEARCH

This invention was made with United States government support from the National Institute of Standards and Technology. The government has certain rights in the invention.

BACKGROUND

Photonic materials are a forefront technology in many areas including high speed telecommunications, photometrics, and sensor devices. For example, wavelength division multiplexing techniques are commonly used to independently transmit a plurality of signals over an optical fiber, and independent data streams are carried by optical fields propagating through an optical fiber at different optical carrier wavelengths corresponding to various signal channels. Photonic materials provide high bandwidth and conserved transmission of information while serving, in some instances, as selective optical filters unaided by traditional chromatic filters. However, engineering of optical systems that include certain photonic materials requires complex and difficult to manufacture components such as modulating and switching devices that need extensive active alignment procedures during fabrication or assembly, resulting in expensive systems that are time-consuming to produce and operate. Such systems often require conversion between optical signals and electronic signals, which can inefficiently consume power. Although headway has been made in using resonant circumferential mode optical resonators for direct optical coupling of a propagating mode of an optical fiber resonant with the optical resonator, application of such photonic materials is still being developed.

Accordingly, methods and equipment for using photonic materials involving optical resonator technology would be advantageous and would be favorably received in the art.

BRIEF DESCRIPTION

The above and other deficiencies are overcome by, in an embodiment, microscope probe comprising: a substrate; an optical resonator disposed on the substrate and comprising an optical resonance property; a displacement member disposed on the substrate and separated from the optical resonator, the displacement member comprising: a first end disposed distal to the optical resonator; and a second end disposed proximate to the optical resonator; and a coupling member disposed on the substrate and connecting the displacement member to the substrate, wherein the first end is configured to probe a sample and to be displaced in response to a condition of the sample, the displacement member is configured to communicate displacement of the first end to the second end, and the second end is configured to change the optical resonance property in response to displacement of the second end.

Further disclosed is a microscope comprising: a microscope probe comprising: a substrate; an optical resonator disposed on the substrate and comprising an optical resonance property; a displacement member disposed on the substrate and separated from the optical resonator, the displacement member comprising: a first end disposed distal to the optical resonator; and a second end disposed proximate to the optical resonator; a coupling member disposed on the substrate and connecting the displacement member to the substrate, wherein the first end is configured to probe a sample and to be displaced in response to a condition of the sample, the displacement member is configured to communicate displacement of the first end to the second end, and the second end is configured to change the optical resonance property in response to displacement of the second end; a waveguide disposed proximate to the optical resonator to receive an electromagnetic wave comprising a first electromagnetic field and to transmit the electromagnetic wave to the optical resonator, the optical resonator being configured to vary the first electromagnetic field to a second electromagnetic field in response to the change of the optical resonance property and to transmit the electromagnetic wave comprising the second electromagnetic field to the waveguide; and an actuator disposed on the displacement member to change a mechanical property of the displacement member in response to application of a stimulus to the actuator; and a detector to detect the second electromagnetic field.

Additionally disclosed is a process for acquiring a condition of a sample, the process comprising: transmitting an electromagnetic wave comprising a first electromagnetic field from a waveguide to an optical resonator disposed on a substrate, the optical resonator comprising an optical resonance property; applying a stimulus to an actuator disposed on a displacement member, the displacement member being disposed on the substrate and separated from the optical resonator, the displacement member comprising: a first end disposed distal to the optical resonator; and a second end disposed proximate to the optical resonator; changing a mechanical property of a displacement member in response to applying the stimulus; probing a sample with the first end; displacing the first end in response to a condition of the sample; communicating displacement of the first end to the second end; changing the optical resonance property in response to displacement of the second end; varying the first electromagnetic field to a second electromagnetic field in response to the change of the optical resonance property; and transmitting the electromagnetic wave comprising the second electromagnetic field to the waveguide to acquire the condition of the sample.

BRIEF DESCRIPTION OF THE DRAWINGS

The following descriptions should not be considered limiting in any way. With reference to the accompanying drawings, like elements are numbered alike:

FIGS. 33A, 33B, and 33C show deflection of a displacement member relative to a surface;

DETAILED DESCRIPTION

A detailed description of one or more embodiments is presented herein by way of exemplification and not limitation.

It has been found that a microscope probe herein provides high sensitivity, broad measurement bandwidth, and long-term stability. The microscope probe is useful in probing, sensing, measurement, manipulation, lithography, pulling, indentation or sensing a topographical feature of a surface or object, e.g., at a microscopic or atomic level. The microscope probe include an optical resonator with torsionally supported displacement member and integrated actuator. As such, the microscope probe is advantageously applied in various devices including an atomic force microscope (AFM), which overcomes conventional limitations in AFM microscopy such as limitations in sensitivity, speed, stability, size, or high cost.

Atomic force microscopy is a type of scanning probe microscopy perfumed by using an AFM to scan a probe over a surface subjected to examination. The probe can be a cantilever with a measuring tip located near a free end of the probe. As the cantilever is traverses the surface, the tip interacts with the surface, which introduces a physical change in the cantilever. The physical change is detected and used to generate a representation of the surface, which may include atomic scale features. Other types of scanning probe microscopes include magnetic force microscopes and electric force microscopes, which detect phenomena other than topography of a sample.

An AFM can operate contact mode (also referred to as constant force mode), dynamic mode (also referred to a noncontact mode), and the like. In the contact mode, the tip is maintained in contact with the surface. As the tip encounters topographical features of the surface, the cantilever deflects and can bend. Deflections of the cantilever are detected, and a distance between the cantilever and the surface can be selectively controlled (e.g., maintained at a constant value) by, e.g., a feedback system, to maintain a constant force between the tip and the surface.

In dynamic mode, the tip is disposed proximate to the surface, and the cantilever is subjected to a perturbation that causes oscillation of the cantilever at a frequency near its resonance frequency. As the cantilever is scanned across the surface, the distance between the tip and surface varies, which presents a change in a force (e.g., a Van der Waals force and the like) between the tip and the surface. As a result, a vibrational amplitude of the cantilever changes and a frequency or phase of the cantilever is detected. Here, a feedback system can selectively maintain the distance between the cantilever and the surface.

A change in force can be less than $10^{-12}$ Newtons (N). The microscope probe herein thus senses these forces by displacement of a displacement member relative to an optical resonator.

Figure 1A:
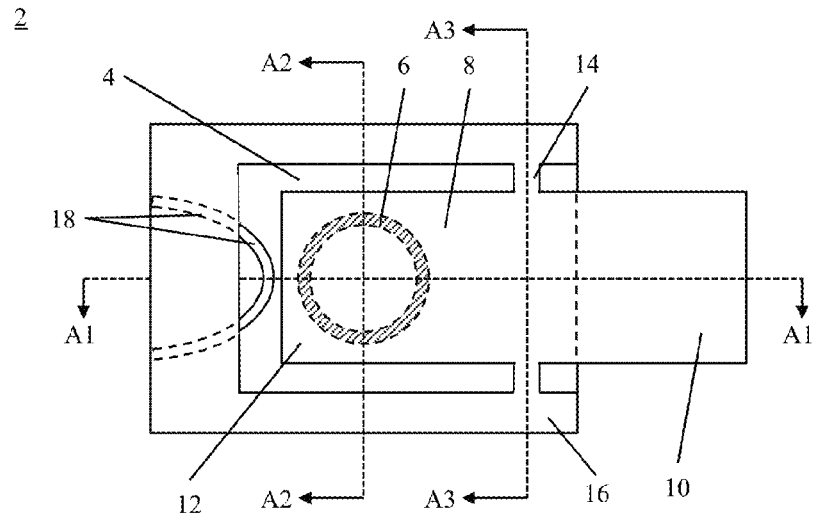
FIG. 1A shows a top view of a microscope probe.

In an embodiment, as shown in FIGS. 1A (top view), 1B (cross-section along line A1-A1 in FIG. 1A), and 1C (cross-section along line A2-A2 in FIG. 1A), microscope probe 2 includes substrate 4 having optical resonator 6 disposed thereon. Displacement member 8 is disposed on substrate 4 and separated from optical resonator 6. Displacement member 8 includes first end 10 disposed distal to optical resonator 6 and second end 12 disposed proximate to optical resonator 6. Coupling member 14 disposed on substrate 16 connects displacement member 8 to substrate 6. Here, first end 10 is configured to probe a sample (not shown) and to be displaced in response to a condition of the sample. Displacement member 8 is configured to communicate displacement of first end 10 to second end 12, and second end 12 is configured to change an optical resonance property of optical resonator 6 in response to displacement of second end 12. Intermediate layer 16 (e.g., a first layer, a second layer, and the like) can be disposed on substrate 4 to allow either direct contact or indirect contact of coupling member 14 to substrate 4. Displacement member 8 is displaced relative to stationary optical resonator 6 and substrate 4. In some embodiments, displacement member 8 is pivotally disposed on substrate 4 by coupling member 14 such that displacement member is pivotally displaced about coupling member 14.

As used herein, displacement of displacement member 2 (e.g., as in displacement member 8 being displaced relative to stationary optical resonator 6) can refer to a physical displacement (e.g., movement from a first position to a second position in space), a change in a vibrational frequency (e.g., a vibrational frequency of first end 10 or second end 12), deformation of displacement member 8, bending of displacement member 8, flexing of displacement member 8, or a combination thereof.

Figure 1B:
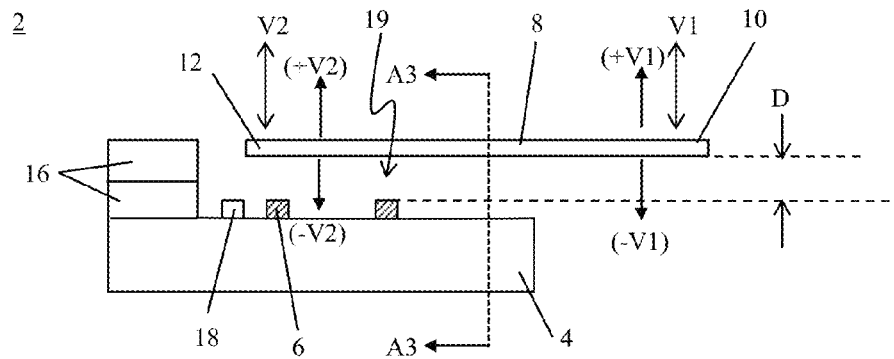
FIG. 1B shows a cross-section along line A1-A1 of the microscope probe of FIG. 1A.
Figure 1C:
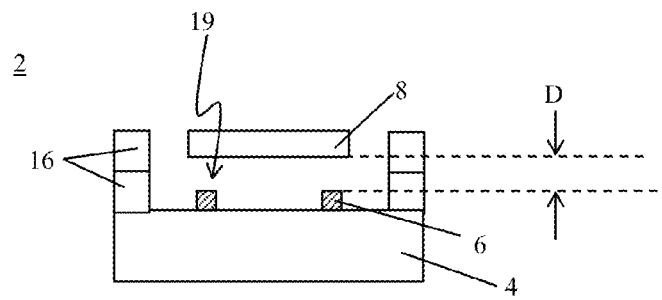
FIG. 1C shows a cross-section along line A2-A2 of the microscope probe of FIG. 1A.

Corresponding to the top view of microscope probe 2 shown in FIG. 1A, a longitudinal cross-section along line A1-A1 is shown in FIG. 1B. Displacement member 8 can be displaced about coupling member 14 substantially along line A3-A3 so that first end 12 is displaced in direction V1 relative to an equilibrium position as shown in FIG. 1B. Similarly, second end 12 can be displaced in direction V2 relative to its equilibrium position. In an embodiment, first end 10 is displaced in direction +V1, and second end 12 is diplaced in direction −V2 such that displacement member 8 exhibits a tottering motion coupling member 14. In another embodiment, first end 10 is displaced in direction −V1, and second end 12 is diplaced in direction +V2 such that displacement member 8 exhibits a tottering motion about coupling member 14.

Gap 19 separates optical resonator 6 and displacement member 8 by a distance D. As second end 12 is displaced, distance D changes. More specifically, as second end 12 moves in direction −V2, distance D decreases. As second end 12 moves in direction +V2, distance D increases. As a result, distance D is variable and depends on a position of second end 12 relative to optical resonator 6.

In this embodiment, displacement member 8 covers optical resonator 6. Presence of optical resonator 6 disposed under displacement member 8 is indicated by the dashed line shown in FIG. 1A. Here, optical resonator 6 is a ring resonator although other optical resonators are contemplated as below noted. Additionally, displacement member 8 is shown having corners where its four side meet; however, a shape of displacement member 8 is not limited thereto and may be a shape such as an oval, square, ellipsoidal, rhombohedral, circular, and the like.

Additionally, microscope probe 2 includes waveguide 18 disposed proximate to optical resonator 6. Waveguide 18 is configured to receive an electromagnetic (EM) wave and to transmit (e.g., evanescently transmit) the EM wave to optical resonator 6. Optical resonator 6 can transmit (e.g., evanescently) an EM wave to waveguide 18. In this manner, EM waves are transmitted between waveguide 18 and optical resonator 6. It is contemplated that transmission of EM waves by optical resonator 6, waveguide 18, or other optical components can occur via evanescence, transmission of freespace EM waves, or any other means effective for an EM wave to propagate from or into such optical element (e.g., optical resonator 6, waveguide 18, and the like). A medium through which an EM wave is transmitted among optical components can be a solid or fluid having a refractive index selected for such transmission.

Figure 2A:
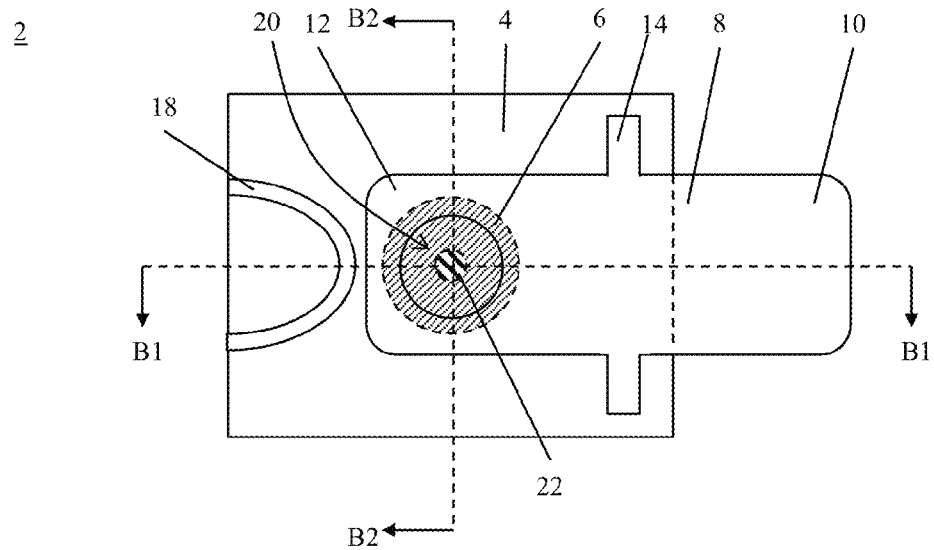
FIG. 2A shows a shows a top view of a microscope probe.
Figure 2B:
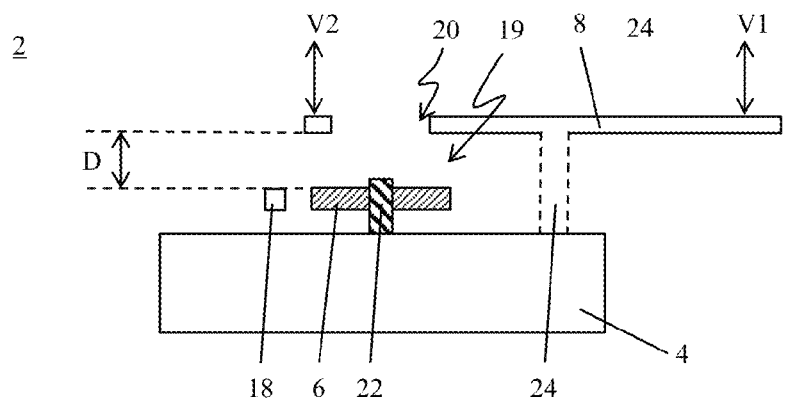
FIG. 2B shows a cross-section along line B1-B1 of the microscope probe of FIG. 2A.
Figure 2C:
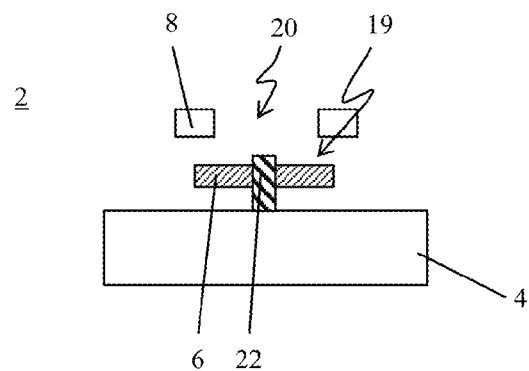
FIG. 2C shows a cross-section along line B2-B2 of the microscope probe of FIG. 2A.

According to an embodiment, as shown in FIGS. 2A (top view), 2B (cross-section along line B1-B1 of FIG. 2A), and 2C (cross-section along line B2-B2 of FIG. 2A), displacement member 8 includes an aperture 20 to expose a portion of optical resonator 6. Here, optical resonator 6 is a microdisk resonator, which is disposed on substrate 4 via stub 22. To ensure optical coupling (e.g., evanescent coupling) between waveguide 18 and optical resonator 6, waveguide 18 is separated from substrate 4 at a distance substantially similar to a distance between optical resonator 6 and substrate 4.

Displacement member 8 includes first end 10 and second end 12 connected to substrate 4 via coupling member 14. Post 24 supports and separates displacement member 8 from substrate 4. Gap 19 separates displacement member 8 from optical resonator 6 by distance D.

Figure 3A:
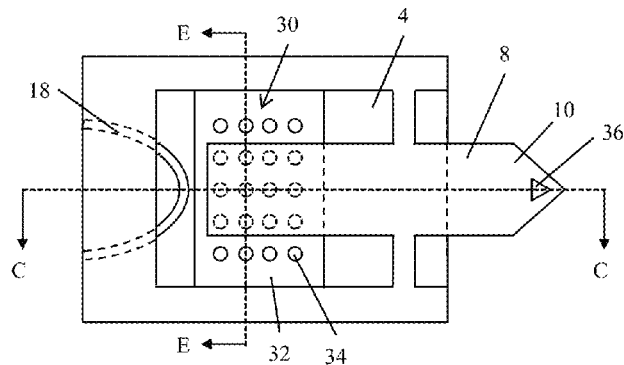
FIG. 3A shows a top view of a microscope probe.

With reference to microscope probe 2 according to the embodiment shown in FIGS. 3A (top view), 3B (cross-section along line E-E of FIG. 3A) and 3C (cross-section along line C-C in FIG. 3A), microscope probe 2 includes a photonic array 30 (e.g., a photonic crystal) disposed on substrate 4. Displacement member 8 includes tip 36 disposed on first end 10. Although tip 36 is shown as having a trigonal pyramid shape, tip 36 can have any shape effective to probe a sample with molecular or atomic resolution, including a cone shape, frustocone shape, cylinder shape, and the like.

Figure 3B:
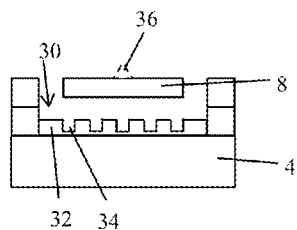
FIG. 3B shows a cross-section along line E-E of the microscope probe of FIG. 3A according to one embodiment.
Figure 3C:
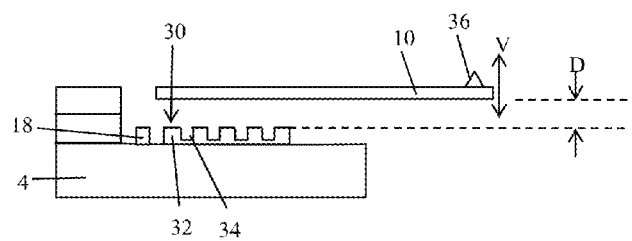
FIG. 3C shows a cross-section along line C-C of the microscope probe of FIG. 3A corresponding to the embodiment of FIG. 3B.
Figure 3D:
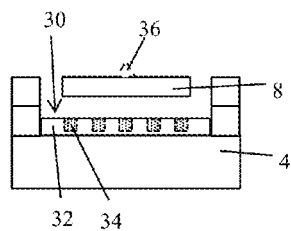
FIG. 3D shows a cross-section along line E-E of the microscope probe of FIG. 3A according to another embodiment.
Figure 3E:
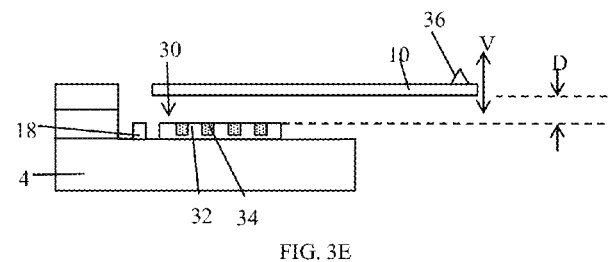
FIG. 3E shows a cross-section along line C-C of the microscope probe of FIG. 3A corresponding to the embodiment of FIG. 3D.

Photonic array 30 includes a propagation material 32 having photonic element 34 disposed therein. The number of photonic elements 34 could be any number effective to perform as the optical resonator evanescently coupled to waveguide 18. Photonic material 32 is an optical medium to evanescently couple with waveguide 18 and transmit EM waves from waveguide 18 to photonic element 34. In the embodiment shown in cross-sectional views of FIGS. 3B and 3C, photonic element 34 is a void have a circular cross-section shown (as shown in the top view of FIG. 3A), but photonic element can have other shapes as well, including square, polygonal, oval, and the like. Furthermore, photonic element 34 can be a blind hole (as shown), through hole (such that any underlying layer (e.g., substrate 4 or a layer besides propagation material 32) is exposed to displacement member 8.

In some embodiments of microscope probe 2 including photonic array 30 (FIG. 3A), propagation material 32 is a first material having a first index of refraction, and photonic element 34 is a second material having a second index of refraction that is different than the first index of refraction. In one embodiment, propagation material 32 and photonic element 34 are a same material (e.g., $SiO_2$), and propagation material 32 and photonic element 34 respectively have a first index of refraction and second index of refraction that are different from each other.

Figure 4:
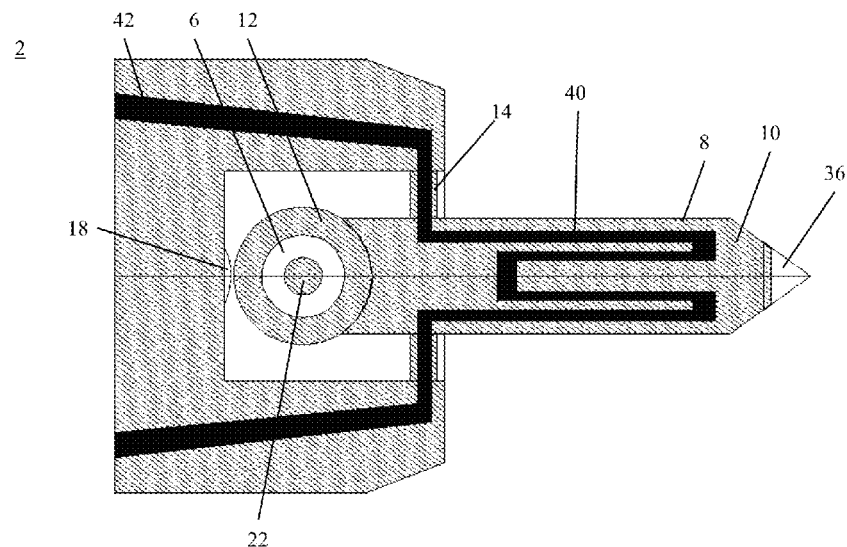
FIG. 4 shows a top view of a microscope probe.
Figure 5:
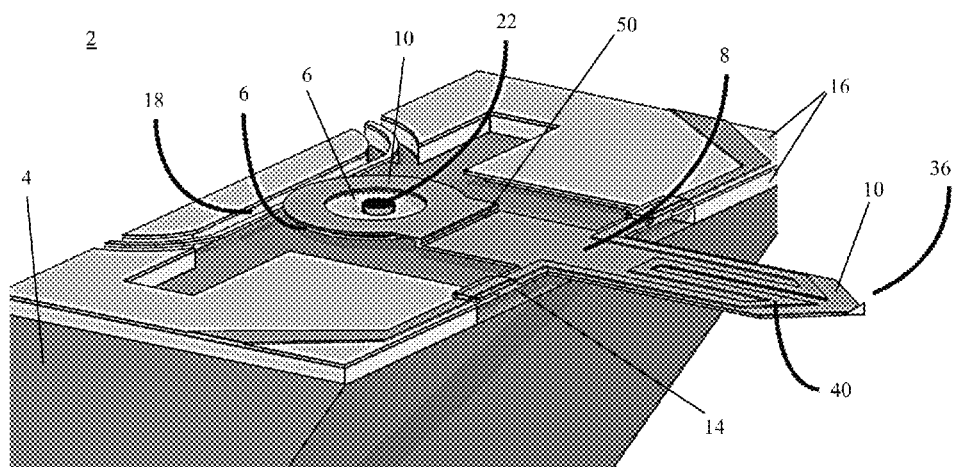
FIG. 5 shows a perspective view of the microscope probe of FIG. 4.

According to an embodiment, microscope probe 2 includes an actuator 40 as shown in a top view in FIG. 4 and perspective view in FIG. 5. Actuator 40 is disposed on displacement member 8 and is configured to change a mechanical property of displacement member 8 in response to application of a stimulus to actuator 40. The mechanical property includes, e.g., a shape of displacement member 8, an oscillation frequency of displacement member 8, or a combination comprising at least one of the foregoing. Actuator 40 can be electrically connected, e.g., to a power source, and biased at a voltage via electrical lead 42. In some embodiments, electrical current flows through actuator 40. As shown, actuator 40 can have a serpentine pattern on displacement member 8. Other shapes for a pattern of actuator 40 on displacement member 40 are contemplated, including linear, zigzag, spiral, parabolic, and the like. Actuator 40 can be disposed on a portion of displacement member 8 or can cover an entire surface of displacement member 40.

As shown, second end 12 can have a shape substantially similar to a shape of optical resonator 6, e.g., a circular shape and can include an aperture 20, or aperture 20 can be absent. Moreover, displacement member 8 can be planar along an upper surface or can have a surface contour provided by a bend.

Figure 6:
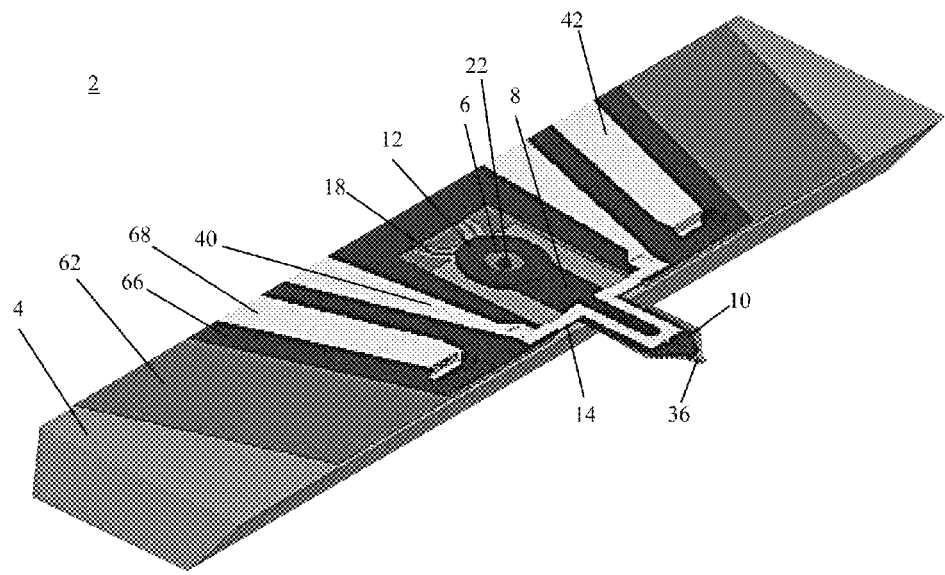
FIG. 6 shows a perspective view of a microscope probe.
Figure 7:
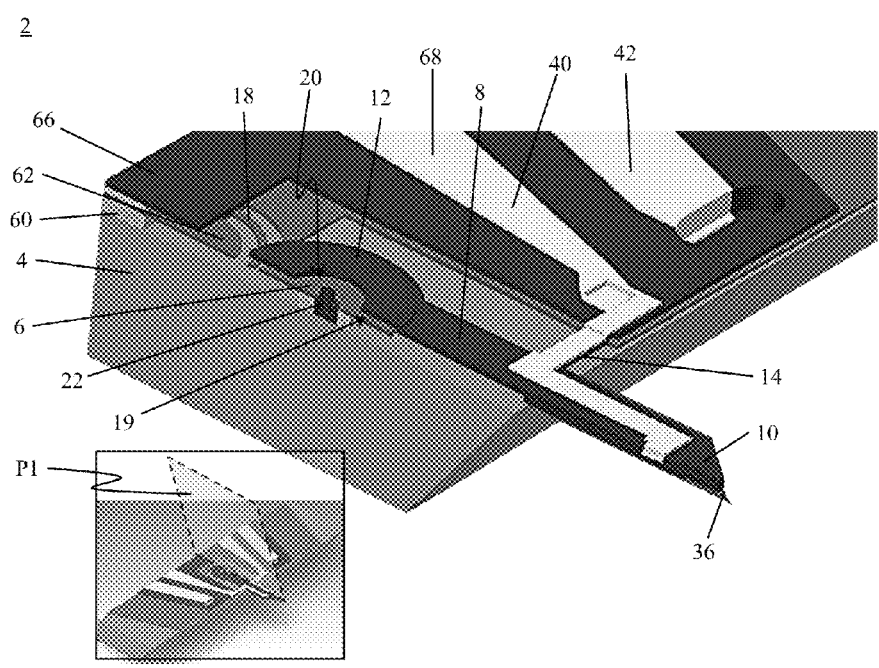
FIG. 7 shows a cross-section taken at plane P1 for the perspective view of the microscope probe shown in FIG. 6.
Figure 8:
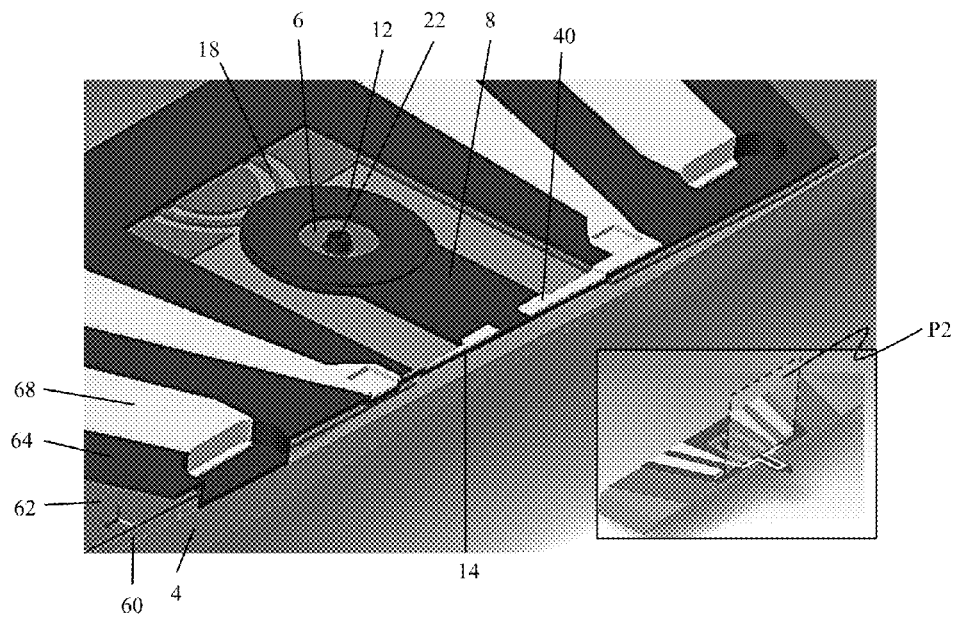
FIG. 8 shows a cross-section taken at plane P2 for the perspective view of the microscope probe shown in FIG. 6.
Figure 9:
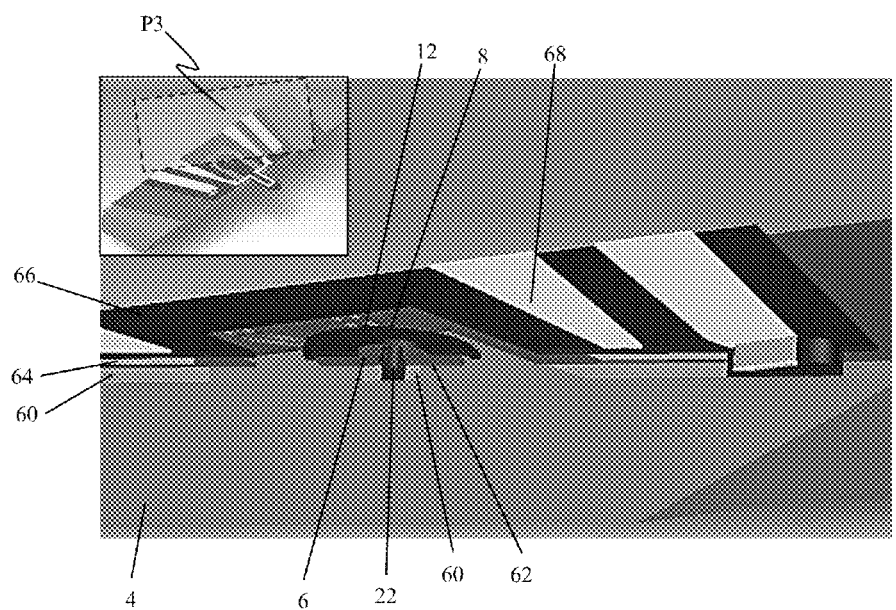
FIG. 9 shows a cross-section taken at plane P3 for the perspective view of the microscope probe shown in FIG. 6.

A perspective view of microscope probe 2 according to an embodiment is shown in FIG. 6. Corresponding cross-sectional views of microscope probe 2 are shown in FIGS. 7, 8, and 9, where each cross-section is taken along a plane P1, P2, or P3 as indicated in the inset that reproduces the perspective view from FIG. 6 for convenience. Here, first layer 60 is disposed on substrate 4 and isolates second layer 62 from substrate 4. Third layer 64 is interposed between fourth layer 66 and second layer 62. Fifth layer 68 is disposed on fourth layer 66. Generally, elements in a same layer include the same or substantially similar materials.

Figure 10:
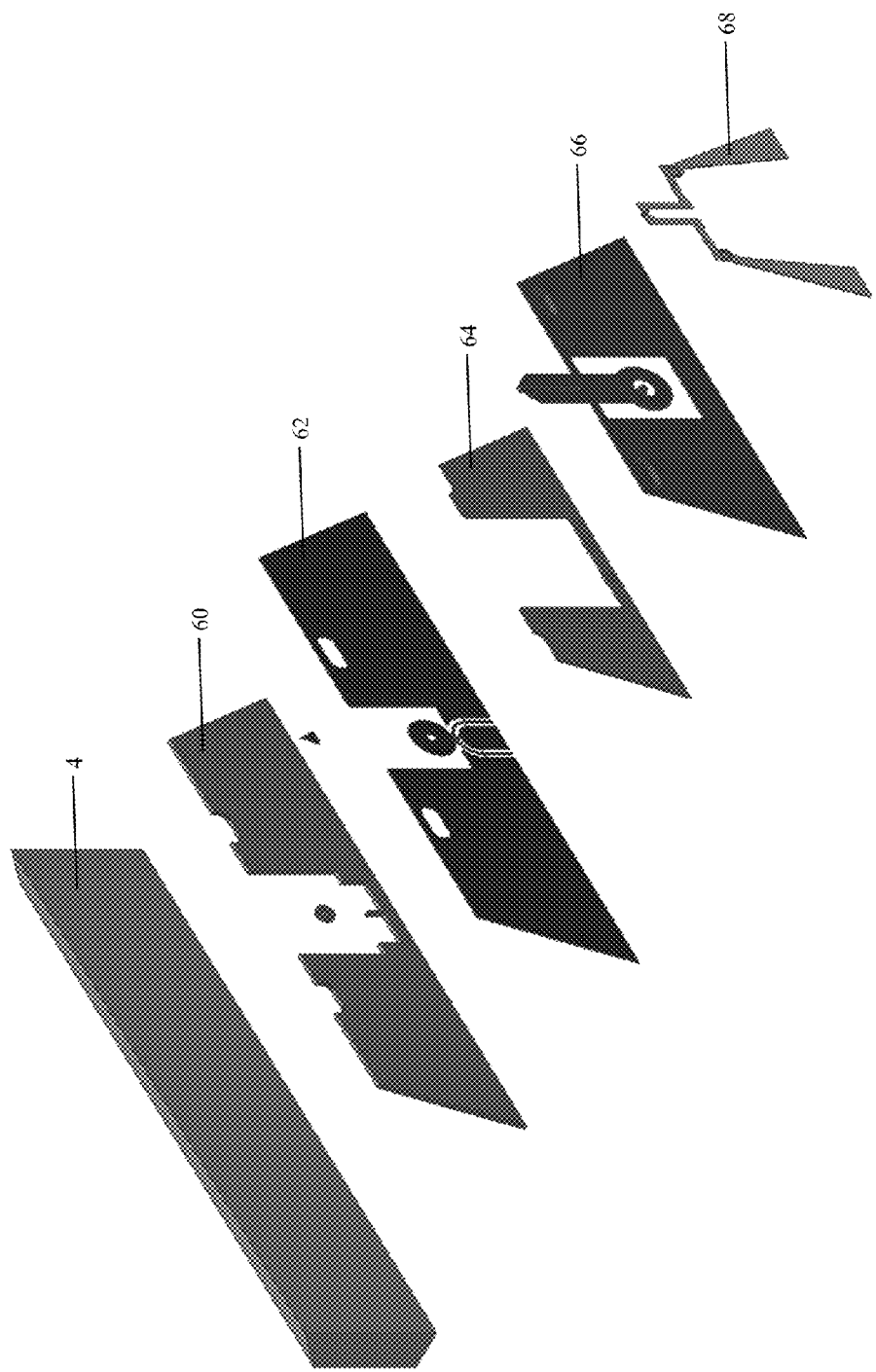
FIG. 10 shows an exploded view of the microscope probe shown in FIG. 6.

An exploded view of microscope probe 8 is shown in FIG. 10 and corresponding top views of first layer 60, second layer 62, third layer 64, fourth layer 66, and fifth layer 68 respectively are shown in FIGS. 11, 12, 13, 14, and 15.

Figure 11:
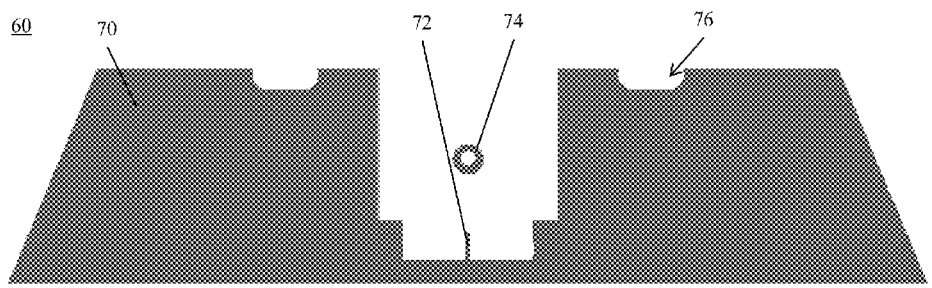
FIG. 11 shows a top view of a first layer of the microscope probe shown in FIG. 6.
Figure 12:
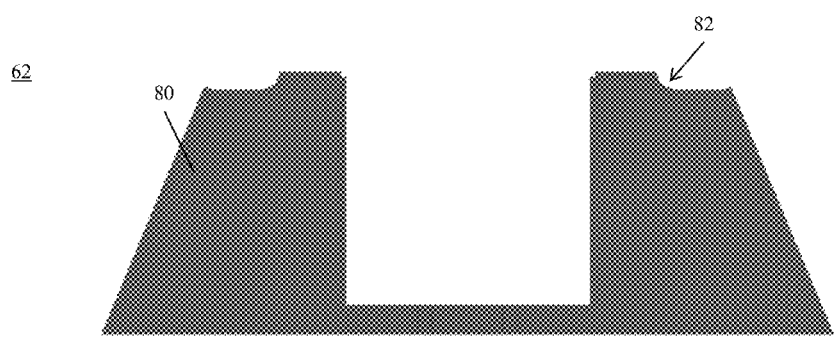
FIG. 12 shows a top view of a second layer of the microscope probe shown in FIG. 6.
Figure 13:
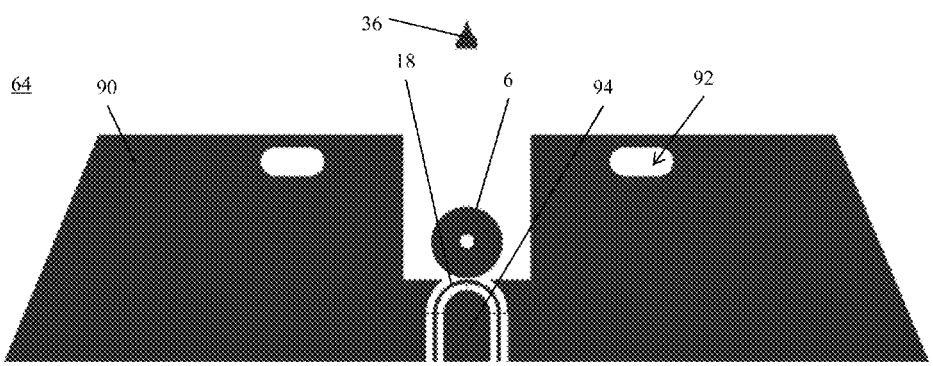
FIG. 13 shows a top view of a third layer of the microscope probe shown in FIG. 6.
Figure 14:
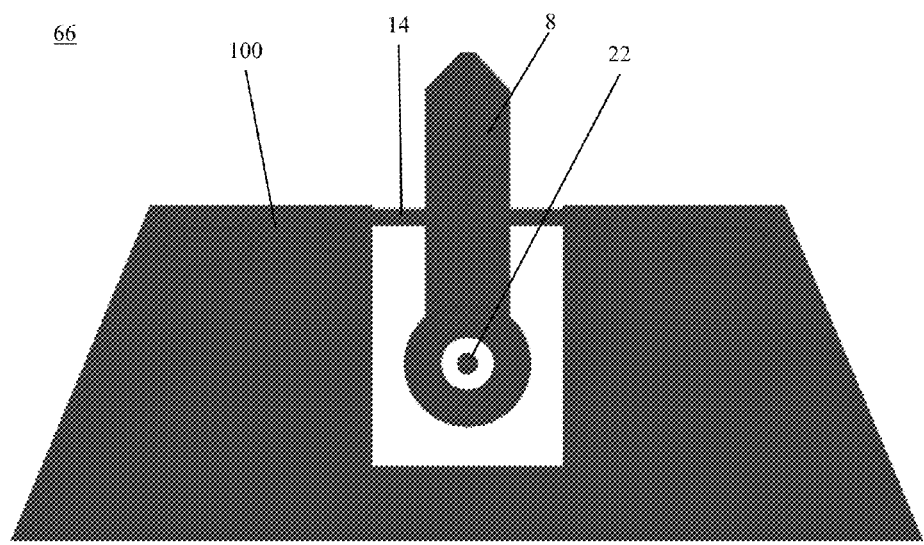
FIG. 14 shows a top view of a fourth layer of the microscope probe shown in FIG. 6.
Figure 15:
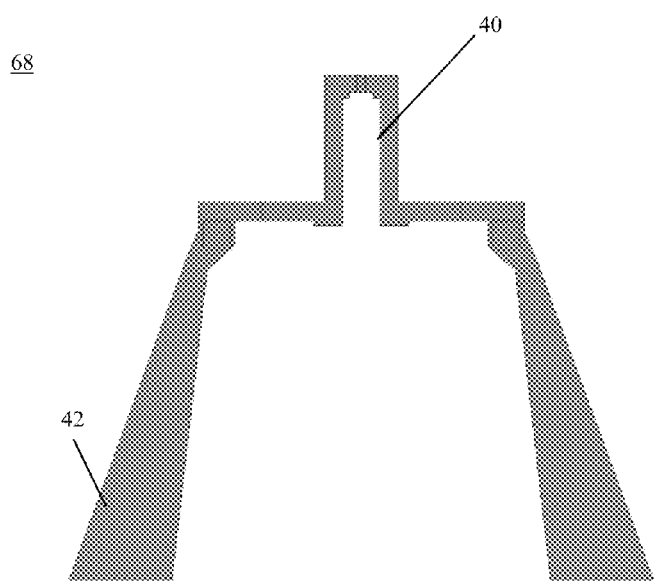
FIG. 15 shows a top view of a fifth layer of the microscope probe shown in FIG. 6.
Figure 16A:
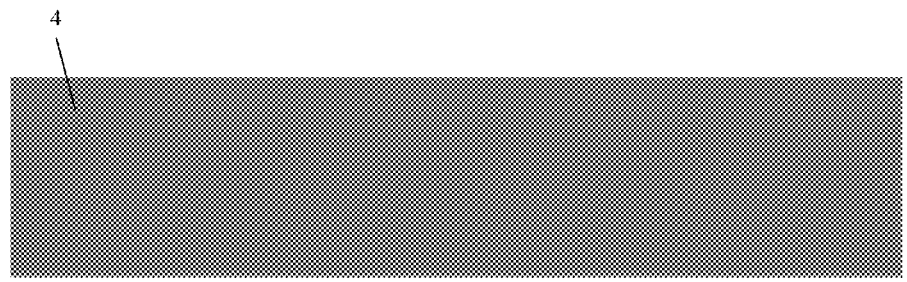
FIGS. 16A, 16B, and 16C respectively show a top view, side view, and perspective view of a substrate of the microscope probe shown in FIG. 6.
Figure 16B:
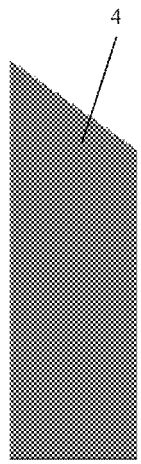
Figure 16C:
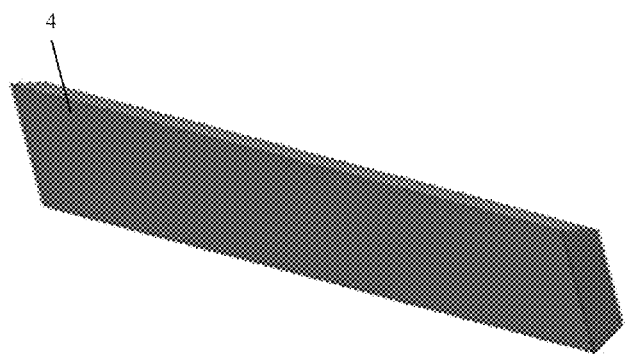
Figure 17A:
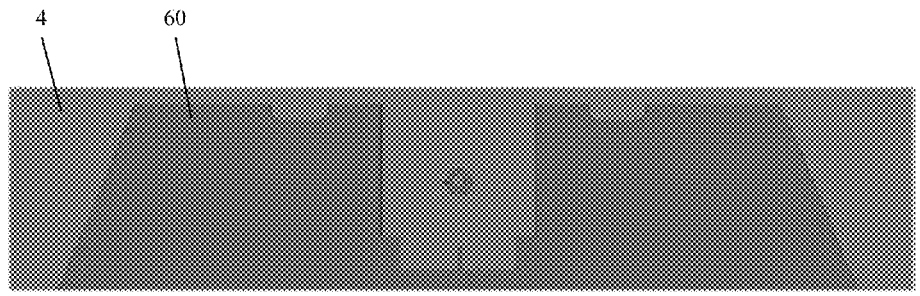
FIGS. 17A, 17B, and 17C respectively show a top view, side view, and perspective view of a first layer disposed on the substrate of the microscope probe shown in FIG. 6.
Figure 17B:
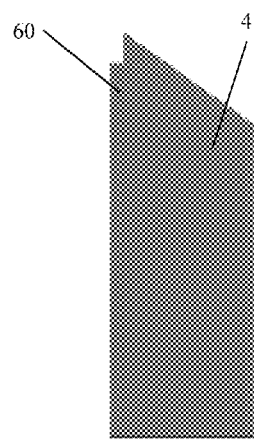
Figure 17C:
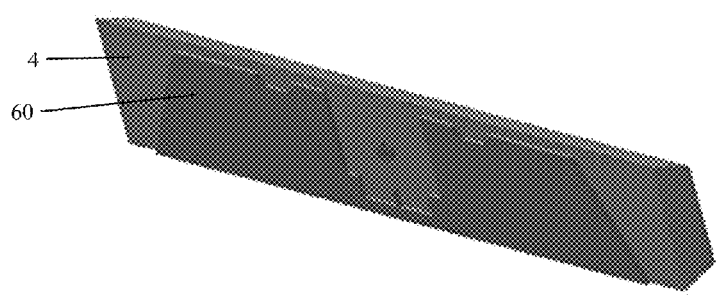
Figure 18A:
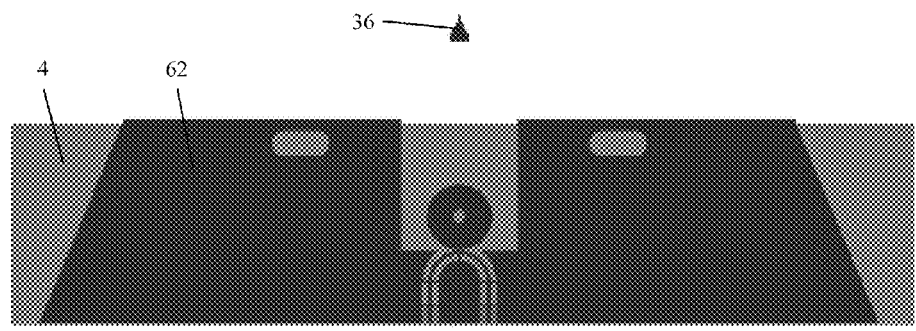
FIGS. 18A, 18B, and 18C respectively show a top view, side view, and perspective view of a second layer disposed on a first layer of the microscope probe shown in FIG. 6.
Figure 18B:
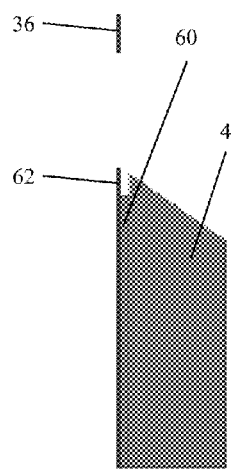
Figure 18C:
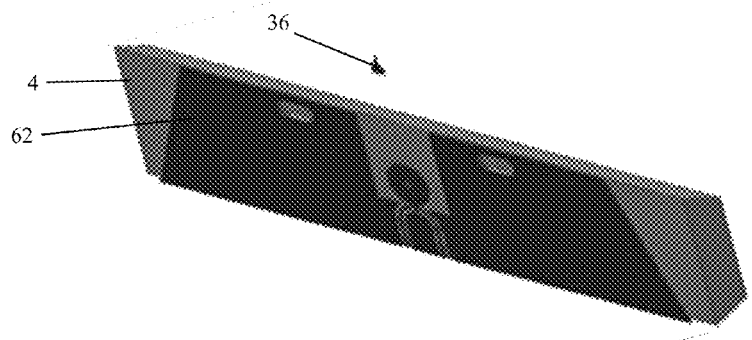
Figure 19A:
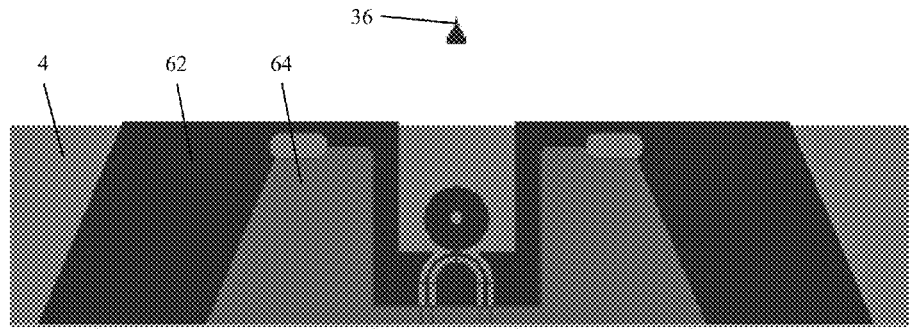
FIGS. 19A, 19B, and 19C respectively show a top view, side view, and perspective view of a third layer disposed on a second layer of the microscope probe shown in FIG. 6.
Figure 19B:
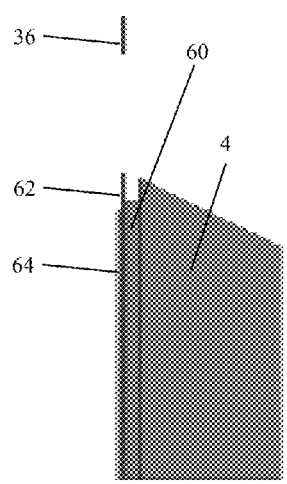
Figure 19C:
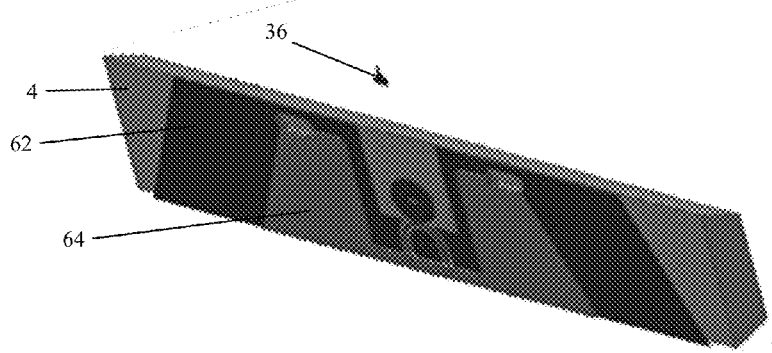
Figure 20A:
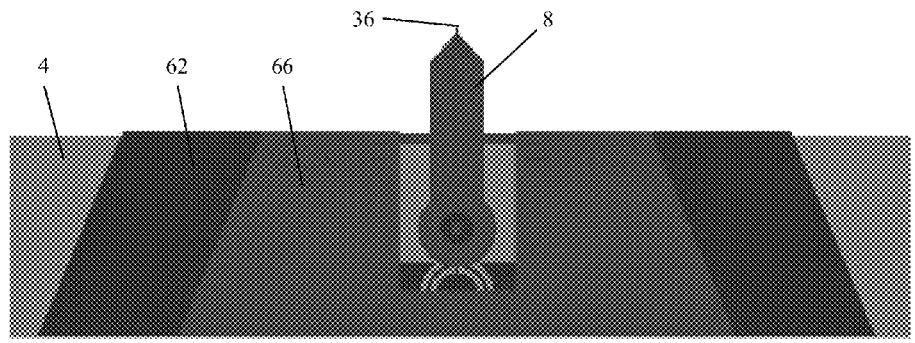
FIGS. 20A, 20B, and 20C respectively show a top view, side view, and perspective view of a fourth layer disposed on a third layer of the microscope probe shown in FIG. 6.
Figure 20B:
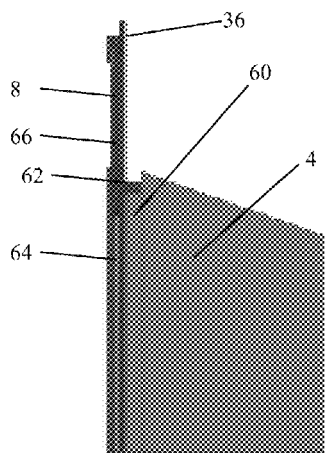
Figure 20C:
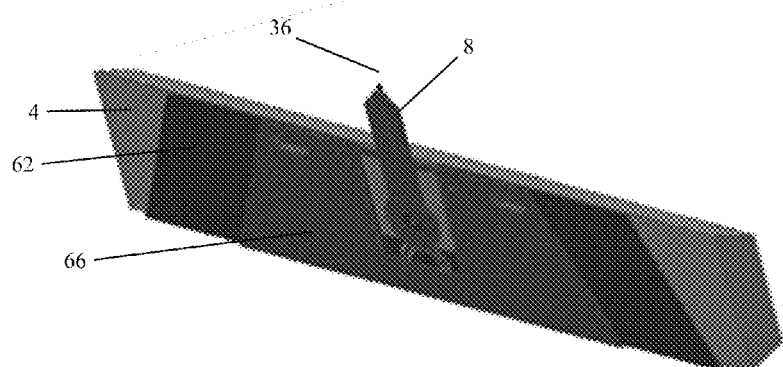
Figure 21A:
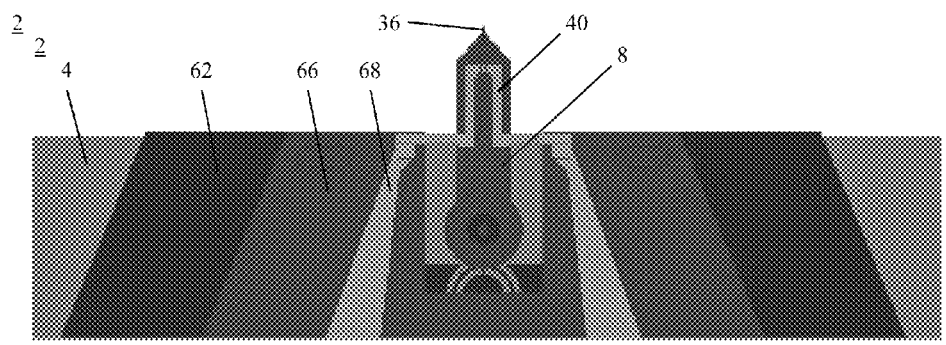
FIGS. 21A, 21B, and 21C respectively show a top view, side view, and perspective view of a fifth layer disposed on a fourth layer of the microscope probe shown in FIG. 6.
Figure 21B:
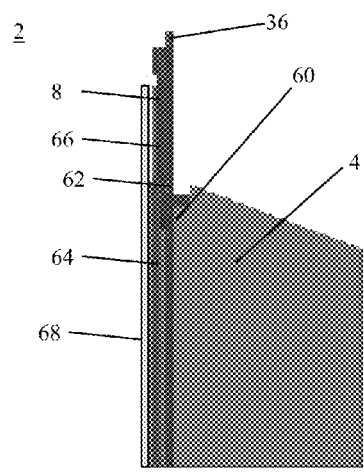
Figure 21C:
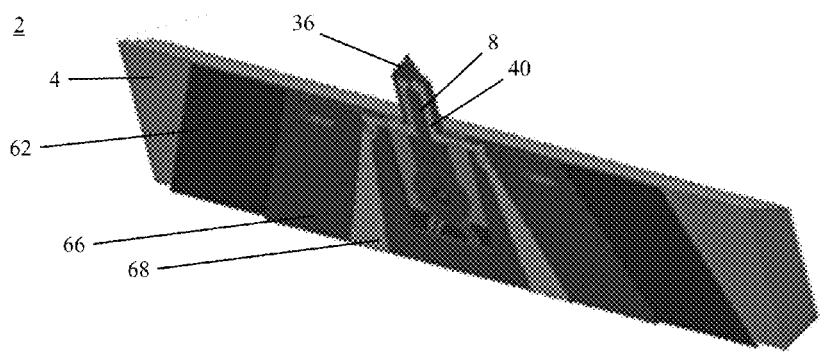

With reference to FIG. 11, first layer 60 includes, e.g., platform 70, protrusion 72, isolator 74, and cutout 76. With reference to FIG. 12, second layer 62 includes, e.g., platform 80 and cutout 82. With reference to FIG. 13, third layer 64 includes, e.g., optical resonator 6, waveguide 18, tip 36, platform 90, cutout 92, and isolator 94. With reference to FIG. 14, fourth layer 66 includes, e.g., displacement member 8, coupling member 14, stub 22, and platform 100. With reference to FIG. 15, fifth layer 68 includes, e.g., actuator 40 and electrical lead 42. FIGS. 16A through 21C further illustrate arrangement of these elements in microscope probe 2 according to the present embodiment. In particular, FIGS. 16A, 16B, and 16C respectively show a top view, side view, and perspective view of substrate 4 of microscope probe 2. FIGS. 17A, 17B, and 17C respectively show a top view, side view, and perspective view of first layer 60 disposed on substrate 4. FIGS. 18A, 18B, and 18C respectively show a top view, side view, and perspective view of second layer 62 (including tip 36) disposed on first layer 60. FIGS. 19A, 19B, and 19C respectively show a top view, side view, and perspective view of third layer 64 disposed on second layer 62. FIGS. 20A, 20B, and 20C respectively show a top view, side view, and perspective view of fourth layer 66 disposed on third layer 64. Here, second layer 62 is not visible in the top view shown in FIG. 20A, and tip 36 is disposed on a surface of displacement member 8 opposing fifth layer 68 (as shown in FIG. 21B). FIGS. 21A, 21B, and 21C respectively show a top view, side view, and perspective view of fifth layer 68 disposed on fourth layer 66 of the microscope probe 2.

Figure 22:
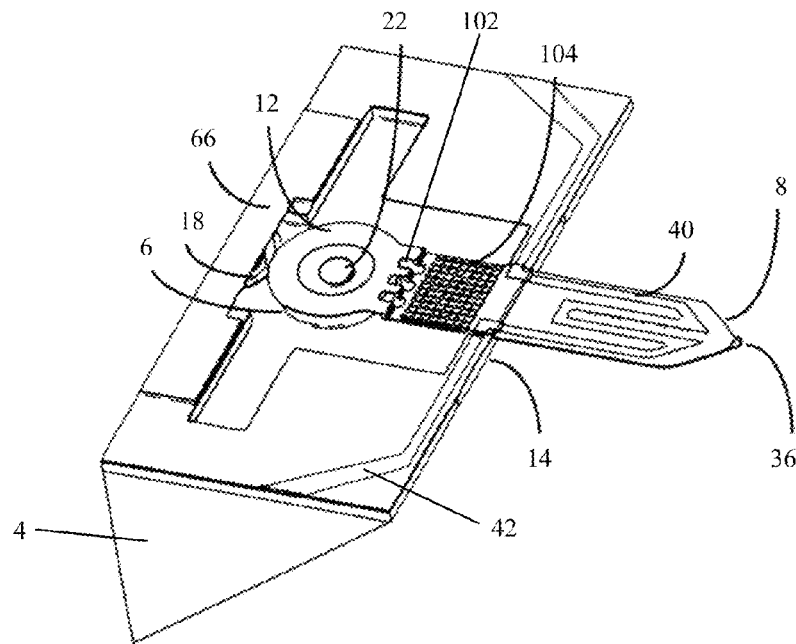
FIG. 22 shows a perspective view of a microscope probe.
Figure 23:
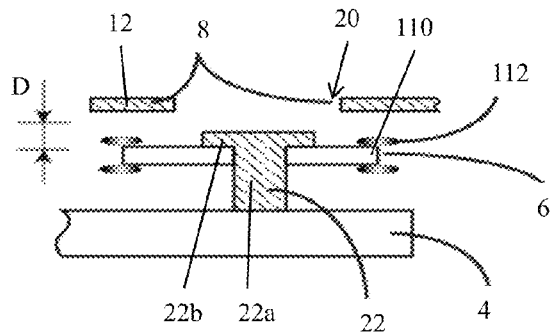
FIG. 23 shows a cross-section of a portion of a microscope probe.

According to an embodiment, displacement member 2 has a plurality of secondary apertures 102 and tertiary apertures 104 as shown in FIG. 22, which can affect bending and oscillation of displacement member 8 such that actuator 40 and apertures (102, 104) provide for selective mechanical actuation of displacement member 8. Moreover, with reference to FIG. 23, in an embodiment, displacement member 8 has aperture 20 at second end 12 disposed proximate to optical resonator 6 (here a ring resonator), which is separated from substrate 4 by stub 22, which includes second body 22b disposed on first body 22a. Optical resonator 6 is surroundingly disposed about first body 22a.

Figure 24:
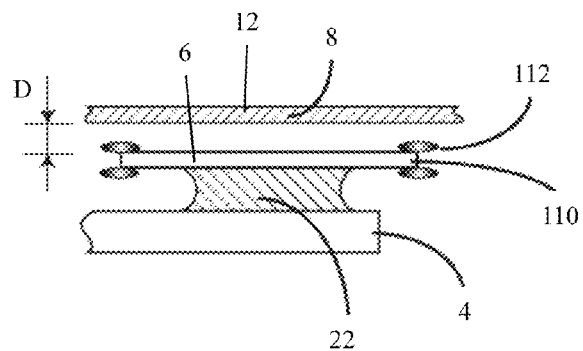
FIG. 24 shows a cross-section of a portion of a microscope probe.

Without wishing to be bound by theory, it is believed that as second end 12 moves with respect to optical resonator 6, an EM wave propagating around a periphery 110 of optical resonator 6 (e.g., in evanescent tail 112) is subjected to a resulting change in a refractive index at periphery 110. As a result, an effective path length changes for a resonant optical mode of optical resonator 6, which affects transmission of an EM field from optical resonator 6 of the EM wave input thereto. As such, an EM field of a signal from optical resonator 6 can be changed (e.g., modulated or have a phase or amplitude varied for the EM wave) in response to movement of displacement member 8 relative to optical resonator 6. It should be noted that evanescent tail 112 is an electromagnetic field rather than a physical structure and is therefore depicted notionally as a diffuse spot in FIGS. 23 and 24. Regarding FIG. 24, in an embodiment, second end 12 of displacement member 8 is disposed proximate to optical resonator 6 (here a microdisk resonator), which is disposed on stub 22. It should be appreciated that EM waves are characterized by an EM field that includes an amplitude and a phase. Here, intensity refers to a square modulus of amplitude.

Figure 25:
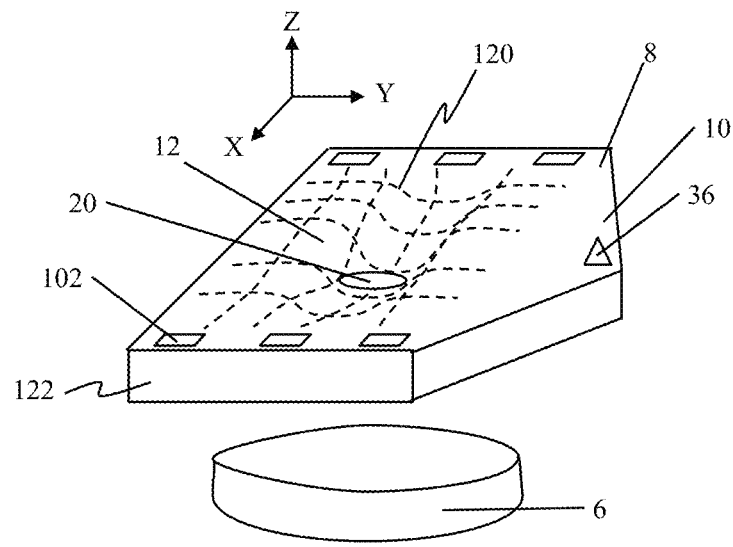
FIG. 25 shows a top view of a displacement member.

In some embodiments, displacement member 8 is rigid or semi-rigid and can bend out-of-plane. In an embodiment, displacement member 8 is a flexible member that flexes in multiple directions corresponding to X, Y, and Z axes as shown in FIG. 25. Here, displacement member 8 includes, e.g., first end 10, second end 12, aperture 20, secondary aperture 102, and tip 36. Further, displacement member 8 connects to substrate 4 via edge 122. Contour curves 120 indicate that displacement member 8 can flex so that a central portion of displacement member 8 proximate to or including aperture 20 is displaced toward (as in FIG. 25) or away from optical resonator 6. Displacement at first end 10 is communicated to second end 12, resulting in flexing of second end 12 proximate to optical resonator 2.

Figure 26:
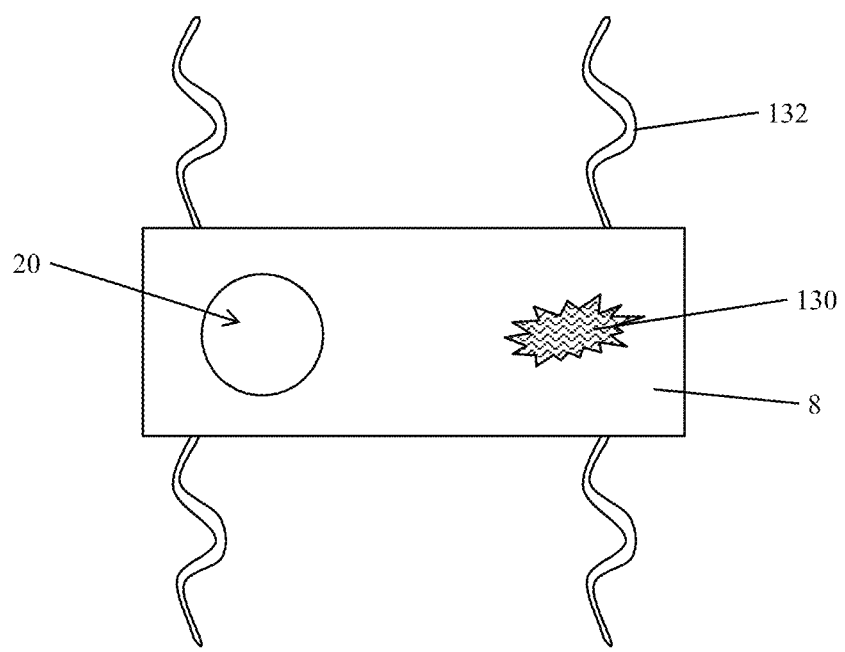
FIG. 26 shows a top view of a displacement member.

In certain embodiments, functional group 130 is disposed on displacement member 8 as shown in FIG. 26. The functional group 130 can be disposed on a portion of displacement member 8 or disposed over an entire surface of displacement member 8. According to an embodiment, functional group 130 is disposed on tip 36. Exemplary functional groups 130 include an atom, molecule, composition, and the like. Functional group 130 can be magnetic, electrically conductive or insulating, and the like. Coupling member 132 is flexible and spring-like such that displacement member 8 is displaced but returns to an equilibrium position relative to optical resonator 6. Coupling member 132 has a spring constant such that coupling member 132 acts as a stiff or soft spring coupling between displacement member 8 and substrate 4. The number and location of coupling members 132 can be any number (e.g., 1, 2, 3, and the like) so that displacement member 8 affects the optical resonant property of the optical resonator 6. Additionally, displacement member 8 can be rigid or flexible. In a particular embodiment, functional group 130 is a region subjection to a force (e.g., pressure), stress, and the like.

Figure 27A:
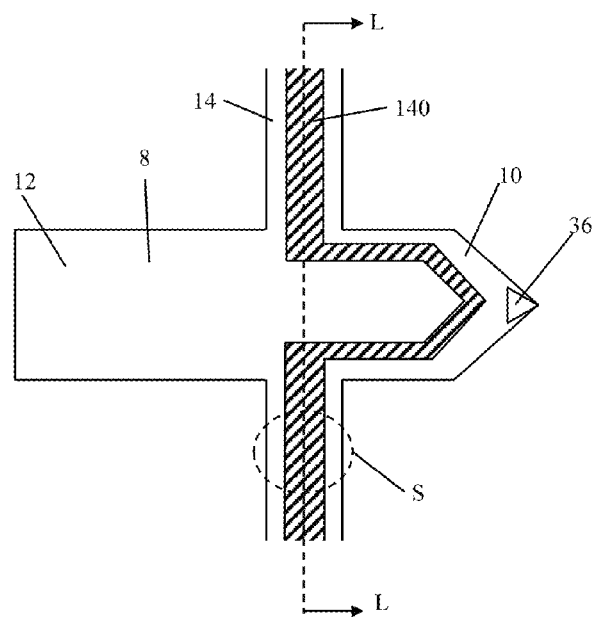
FIG. 27A shows a top view of a displacement member.
Figure 27B:
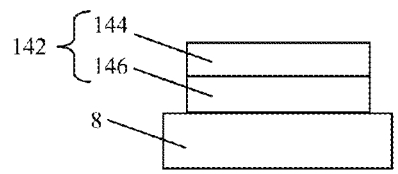
FIG. 27B shows a cross-section of portion S of the displacement member shown in FIG. 27A according to an embodiment that includes a bimorphic member.

With reference to an embodiment shown in FIG. 27A, actuator 140 is disposed on coupling member 14 and first end 10 of displacement member 8. Actuator 140 can be bimorphic member 142, electrostatic member 150, or a combination thereof. In some embodiments, as shown in FIG. 27B (a cross-sectional view of portion S from FIG. 27A), actuator 140 is bimorphic member 142. Bimorphic member 142 can include a metal disposed as a layer on displacement member 8. Here, bimorphic member 142 includes a plurality of layers (144, 146) that include a first metal in primary layer 144 and a second metal in auxiliary layer 146. The metal is a dissimilar material than that of displacement member 8. When bimorphic member 142 includes a plurality of metals, the first metal and second metal are different from one another, or primary layer 144 includes a different element from auxiliary layer 146. In an embodiment, the metal has a different coefficient of thermal expansion than displacement member 8. In one embodiment, the first metal has a different coefficient of thermal expansion than the second metal. In this manner, displacement member 8 bends (as shown in FIG. 27D) in response to passing current through bimorphic member 142, which locally heats actuator 140 and displacement member 8, and the actuator 140 expands at a different rate than displacement member 8.

Figure 27C:
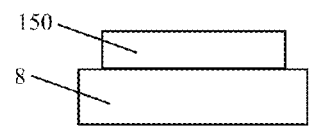
FIG. 27C shows a cross-section of portion S of the displacement member shown in FIG. 27A according to an embodiment that includes an electrostatic member.

As shown in an embodiment of FIG. 27C (a cross-sectional view of portion S from FIG. 27A), actuator 140 is electrostatic member 150. Electrostatic member 150 can include a metal disposed on displacement member 8. Here, when a potential is applied to electrostatic member 150, displacement member (particularly first end 10) is displaced due to electrostatic repulsion or electrostatic attraction from another body, e.g., substrate 4 or a sample.

Figure 27D:
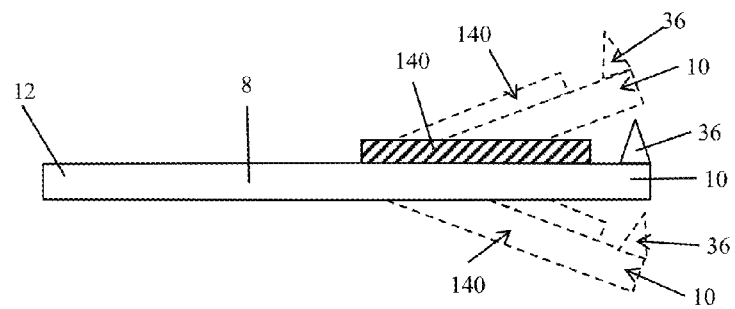
FIG. 27D shows a cross-section along line L-L of the displacement member shown in FIG. 27A.

Due to actuator 140, displacement member 8 bends in response to application of a stimulus to actuator 140 as illustrated in FIG. 27D, which shows a cross-section along line L-L of displacement member 8 from FIG. 27A. Here, displacement member 8 bends along line L-L. FIG. 27D also includes certain features (tip 36, first end 10, and actuator 140) shown in dashed lines to indicate direction of movement of these features when displacement member 8 is subject to actuation by actuator 140. Accordingly, by applying a stimulus to actuator 140, a displacement (including a position) of first end 10 can be controlled with respect to second end 12.

Figure 27E:
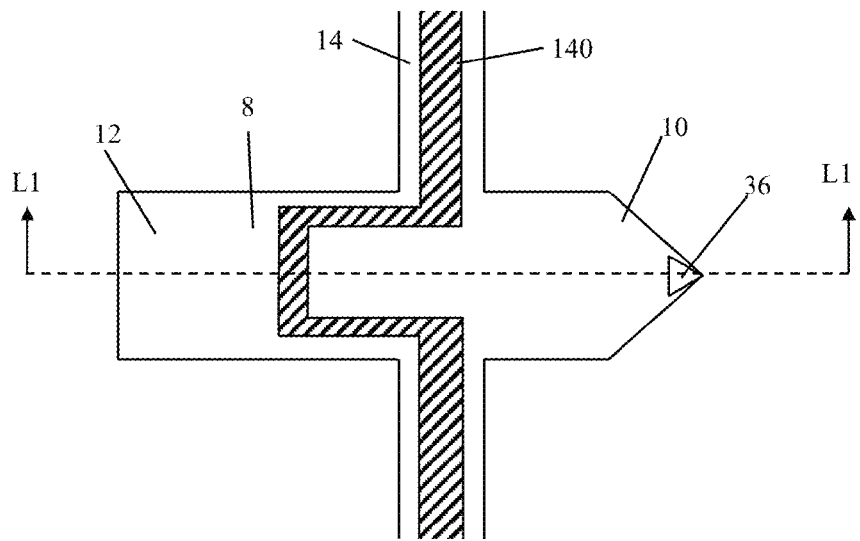
FIG. 27E shows a top view of a displacement member.

With reference to an embodiment shown in FIG. 27E, actuator 140 is disposed on coupling member 14 and second end 12 of displacement member 8. Actuator 140 can be bimorphic member 142, electrostatic member 150, or a combination thereof. A shown in the cross-sectional view along line L1-L1, displacement member 8 bends in response to application of a stimulus to actuator 140. Here, displacement member 8 bends along line L1-L1 such that second end 12 is displaced away or toward optical resonator 6 as depicted by certain features (second end 12 and actuator 140) shown in dashed lines to indicate direction of movement of these features. Accordingly, by applying a stimulus to actuator 140, a displacement (including a position) of second end 10 can be controlled with respect to first end 10 and optical resonator 6.

Figure 27F:
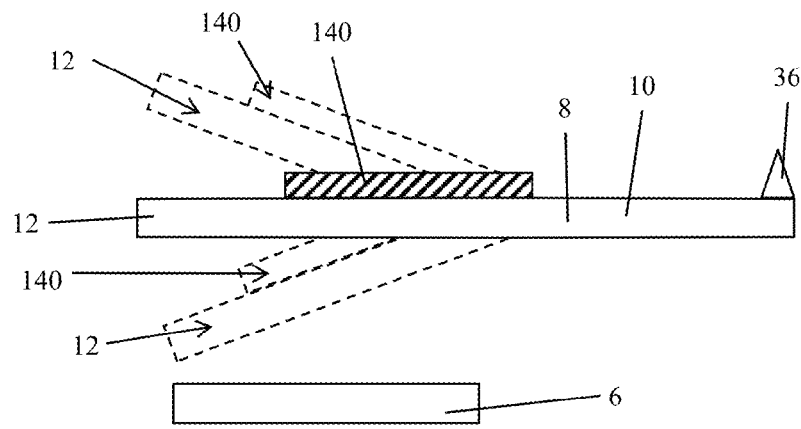
FIG. 27F shows a cross-section of portion S of the displacement member shown in FIG. 27D.
Figure 27G:
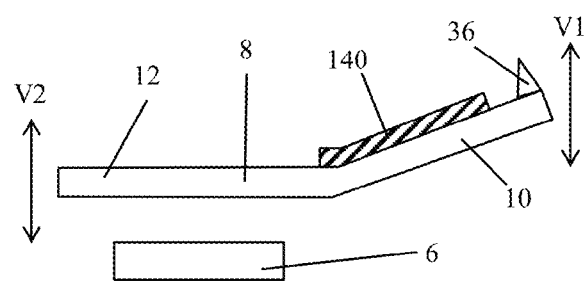
FIG. 27G shows a cross-section along line L-L of the displacement member shown in FIG. 27A after adjustment of a first end of the displacement member.

According to an embodiment, as shown in FIG. 27G, after first end 10 (or alternatively second end 12, as applicable depending on location of actuator 140) is positioned by application of the stimulus to actuator 140, displacement member 8 can be subjected to further displacement of first end 10 by interaction of tip 36 by a sample (not shown). As a result, first end 10 is displaced in direction V1, and such displacement is communicated along displacement member 8 to second end 12. Second end 12 then responds by being displaced in direction V2 to change an optical resonant property of optical resonator 6.

With respect to selectively controlling the position of the first end 10 or second end 12 by application of a stimulus as shown in FIGS. 27D and 27F, such positioning can be static, i.e., a desired position selected and first end 10 or second end 12 held in the desired position. In view of obtaining a static position of first end 10 (or second end 12) occurs, a dynamic resonance excitation of displacement member 8 occurs as depicted in FIG. 27G, such excitation can occur due to interaction with a sample or by further application of stimulus to actuator 140.

Figure 28A:
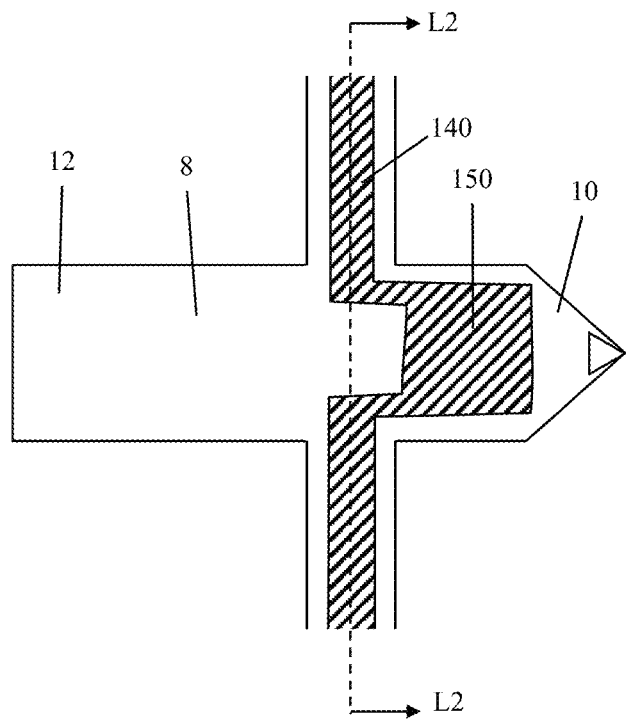
FIG. 28A shows a top view of a displacement member.
Figure 28B:
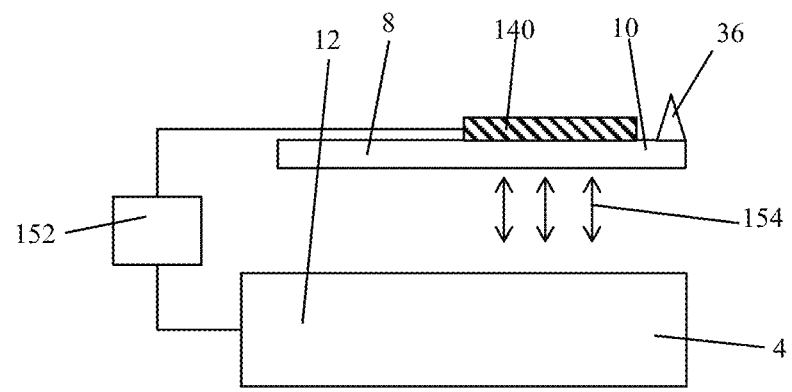
FIG. 28B shows a cross-section of the displacement member shown in FIG. 28A disposed on a substrate and connected to a power source.

In an embodiment, actuator 140 is disposed on displacement member 8 as shown in FIG. 28A and by cross-section view along line L2-L2 in FIG. 28B. Here, actuator 140 is an electrostatic member 150, disposed on first end 10. Electrostatic member 150 can be electrically connected to power source 152 and referenced to, e.g., substrate 4 to produce electric field 154. Displacement member 8 can be displaced relative to substrate 4 due to a magnitude of electric field 154 and stiffness of displacement member 8.

Figure 29:
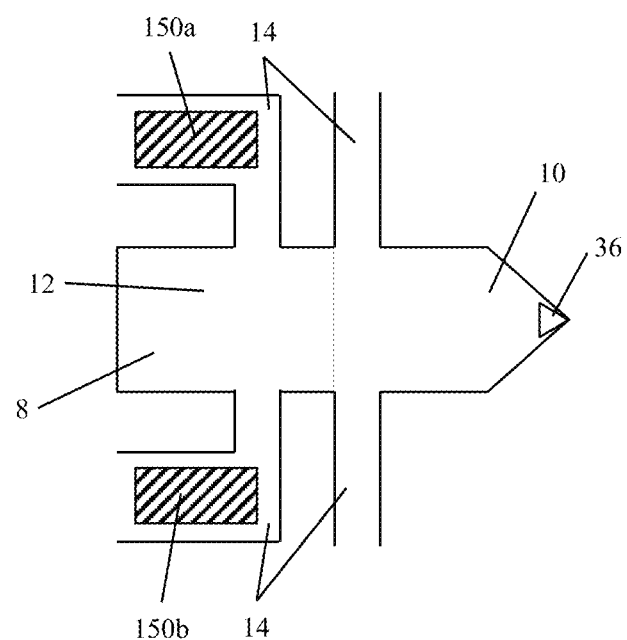
FIG. 29 shows a top view of a displacement member.

According to an embodiment, as shown in FIG. 29, electrostatic members (150a, 150b) are disposed on disposed on coupling member 14, which connects displacement member 8 to substrate 4. Electrostatic member 150a and electrostatic member 150b can be, e.g., an electrode or electrical contact pad that is electrically connected to a power source to produce a potential difference between displacement member 8 and substrate 4. Thus, displacement member 8 can be displaced relative to substrate 4 due to an application of an electrostatic force due to the potential difference thereto, and a magnitude of the displacement can be proportional to a magnitude of the electrostatic force or stiffness of displacement member 8.

As discussed above, an embodiment of the microscope probe includes the substrate. Microscope probe 2 is generally made using nanofabrication or microfabrication processing technology and can include layer formation on a silicon on insulator (SOI) substrate. The substrate can include a various elements from the periodic table (e.g., group 11, 12, 13, 14, 15, 16, and the like) as well as dopants (e.g., an alkali metal, alkaline earth metal, transition metal, rare earth metal, and the like) and other species. Exemplary elements include group Si, Ge, As, Al, In, P, C, S, O, Ga, N, and the like. A dopant can be in a concentration from 0 weight percentage (wt %) to 0.5 wt %, specifically from 0 wt % to 0.1 wt %, and more specifically from 0 wt % to 0.01 wt %.

In a particular embodiment, the substrate includes a semiconductor. An exemplary semiconductor is an element from group 11, 12, 13, 14, 15, or 16 (IUPAC nomenclature, which respectively is identical to group I, II, III, IV, V, or VI) of the periodic table such as a Si, Ga, Ge, As, In, Sn, Sb, Te, At, Hf, Zn, and the like, or a combination thereof. According to an embodiment, the substrate is a compound semiconductor such as SiC, SiGe, GaN; a group 13-15 (also referred to as a group III-V) semiconductor such as AlSb, AlAs, AlN, AlP, BN, GaSb, GaAs, GaN, GaP, InSb, InAs, InN, InP, and the like; a group 12-16 (group II-VI) semiconductor such as CdSe, CdS, CdTe, ZnO, ZnSe, ZnS, ZnTe, and the like; a group 11-17 (group I-VII) semiconductor such as CuCl and the like; a group 14-16 (group IV-VI) semiconductor such as PbS, PbTe SnS, and the like; a layer semiconductor such as $PbI_2$, $MoS_2$, GaSe, and the like; an oxide semiconductor such as CuO, $Cu_2O$, and the like; (Al,Ga)N, (Al,Ga)As, (In,Ga)As, (Al,Ga)Sb, (In,Ga)Sb, as well as nitride, arsenide, antimonide quaternary III-V alloys, or a combination comprising at least one of the foregoing. Examples of II-VI alloys include, but are not limited to CdSe, CdTe, CdS, ZnSe, and combinations thereof. Examples of Group III-V ternary alloys include, but are not limited to, (Ga,Al)As, (In,Ga)As, and combinations thereof. Exemplary Group III-V quaternary alloys include (Ga,In)(As,P), (In,Al,Ga)Sb, and the like. Exemplary Group III-nitride alloys include (Ga,Al)N, (Ga,In)N, (Al,In)N, (Ga,Al,In)N, and combinations thereof. Quaternary alloys of the above may also be employed.

The substrate also can include a supplemental element such as C, H, N, Li, Na, K, Mg, Ca, Sr, Ba, Bi, B, Al, P, S, O, and the like in an amount typically less than an amount of the semiconductor. In an embodiment, the substrate includes silicon, and the silicon is optionally doped. According to an embodiment, the semiconductor is an intrinsic semiconductor or an extrinsic semiconductor doped with a selected dopant, e.g., a p-dopant or an n-dopant. In one embodiment, the substrate includes a p-dopant. In another embodiment, the substrate includes an n-dopant. In a particular embodiment, the substrate is p-doped Si. In one embodiment, the substrate is n-doped Si. The substrate can be produced from, e.g., commercially available semiconductor grade p-doped Si having a particular crystalline orientation, e.g., having Miller indices <111>, <100>, and the like. The substrate can be amorphous, polycrystalline, or a single crystal. In an embodiment, the substrate has a stacked structure that includes a plurality of semiconductor layers such as by forming films as SiGe/Si/SiGe/Si on the Si substrate. In some embodiments, the substrate includes crystalline domains among amorphous material. In another embodiment, the substrate is made of glass, Silicon dioxide, pyrex, or sapphire.

First layer 60 is disposed on substrate 4 (as in the exploded view of FIG. 10). First layer 60 generally isolates second layer 62 from substrate 60 and can include an oxide of an element in substrate 4 or independently can be an oxide of a semiconductor material such as $SiO_2$. According to an embodiment, first layer 60 is an oxide such as an oxide that includes an element from substrate 4, e.g., an oxide of the semiconductor (also referred to herein as a semiconductor oxide). In an embodiment, substrate 4 includes Si, and first layer 60 includes silicon dioxide ($SiO_2$). Other first layer 60 materials include gallium oxide ($GaO_3$), aluminum oxide ($Al_2O_3$), or alloys thereof, oxides of compounds from Groups III and V or alloys thereof, and the like. Exemplary oxides in the dielectric layer also include ZnO, $HfO_2$, $SnO_2$, $In_2O_3$, $Zn_2SnO_4$, $Ga_2O_3$, $Al_2O_3$, and the like. In an embodiment, first layer 60 is a product of oxidation of a portion of the substrate to produce the semiconductor oxide. According to one embodiment, the oxide is a product of rapid thermal oxidation (RTO) of substrate 4 so that the oxide (first layer 60) is derived from substrate 4. In another embodiment, the oxide is a product of low temperature oxidation (LTO) of substrate 4 to produce an oxide. In a further embodiment, the oxide is a product of depositing the oxide on substrate 4, which may or may not involve oxidation of substrate 4. In a certain embodiment, first layer 60 includes $SiO_2$ as the oxide, which is a product of oxidation of substrate 4 that includes Si. In some embodiments, first layer 60 includes a semiconductor oxide, a ceramic (e.g., $ZrO_2$, $Al_2O_3$, SiC, $Si_3N_4$, BN, $BaTiO_3$, and the like), a glass, or a combination comprising at least one of foregoing.

Second layer 62 can be a same material or different material than substrate 4. Second layer 62 includes optical resonator 6, tip 36, and waveguide 18. Accordingly, second layer 62 and these elements (optical resonator 6, tip 36, and waveguide 18) can be is an element from group 11, 12, 13, 14, 15, or 16 of the periodic table such as a Si, Ga, Ge, As, In, Sn, Sb, Te, At, Hf, Zn, and the like, or a combination thereof. According to an embodiment, second layer 62 is a compound semiconductor such as SiC, SiGe, GaN; a group 13-15 (also referred to as a group III-V) semiconductor such as AlSb, AlAs, AlN, AlP, BN, GaSb, GaAs, GaN, GaP, InSb, InAs, InN, InP, and the like; a group 12-16 (group II-VI) semiconductor such as CdSe, CdS, CdTe, ZnO, ZnSe, ZnS, ZnTe, and the like; a group 11-17 (group I-VII) semiconductor such as CuCl and the like; a group 14-16 (group IV-VI) semiconductor such as PbS, PbTe SnS, and the like; a layer semiconductor such as $PbI_2$, $MoS_2$, GaSe, and the like; an oxide semiconductor such as CuO, $Cu_2O$, and the like; (Al,Ga)N, (Al,Ga)As, (In,Ga)As, (Al,Ga)Sb, (In,Ga)Sb, as well as nitride, arsenide, antimonide quaternary III-V alloys, or a combination comprising at least one of the foregoing. Examples of II-VI alloys include, but are not limited to CdSe, CdTe, CdS, ZnSe, and combinations thereof. Examples of Group III-V ternary alloys include, but are not limited to, (Ga,Al)As, (In,Ga)As, and combinations thereof. Exemplary Group III-V quaternary alloys include (Ga,In)(As,P), (In,Al,Ga)Sb, and the like. Exemplary Group III-nitride alloys include (Ga,Al)N, (Ga,In)N, (Al,In)N, (Ga,Al,In)N, and combinations thereof. Quaternary alloys of the above may also be employed. Second layer also can include a supplemental element such as C, H, N, Li, Na, K, Mg, Ca, Sr, Ba, Bi, B, Al, P, S, O, and the like in an amount typically less than an amount of the semiconductor.

In an embodiment, second layer 62 includes silicon, and the silicon is optionally doped. According to an embodiment, the semiconductor is an intrinsic semiconductor or an extrinsic semiconductor doped with a selected dopant, e.g., a p-dopant or an n-dopant. In one embodiment, second layer 62 includes a p-dopant. In another embodiment, second layer 62 includes an n-dopant. In a particular embodiment, second layer 62 is p-doped Si. In one embodiment, second layer 62 is n-doped Si. Second layer 62 can be produced from, e.g., commercially available semiconductor grade p-doped Si having a particular crystalline orientation, e.g., having Miller indices <111>, <100>, and the like. Second layer 62 can be amorphous, polycrystalline, or a single crystal. In an embodiment, second layer 62 has a stacked structure that includes a plurality of semiconductor layers such as by forming films as SiGe/Si/SiGe/Si on the Si substrate. In some embodiments, second layer 62 includes crystalline domains among amorphous material.

Third layer 64 of microscope probe 2 is typically an oxide layer of a semiconductor material. In an embodiment, third layer 64 is independently any of the foregoing materials recited for second layer 62.

Fourth layer 66 includes displacement member 8. According to an embodiment, displacement member 8 includes a nitride of a semiconductor material. In some embodiments, fourth layer 66 is independently a nitride of any of the foregoing materials recited for first layer 62. Exemplary nitrides includes SiN, GaN, and the like.

In some embodiments, the functional group 130 is disposed on displacement member 8. Functional group 130 can be any material that interacts with a sample to achieve displacement of displacement member 8 by virtue of interaction of functional group 130 with the sample. Exemplary functional groups include ferromagnetic material, paramagnetic material, biological material (e.g., DNA, an antibody, amino acid, peptide, polypeptide, protein, glycoprotein, lipoprotein, antibody, nucleoside, nucleotide, oligonucleotide, nucleic acid, sugar, carbohydrate, oligosaccharide, polysaccharide, fatty acid, lipid, hormone, metabolite, growth factor, cytokine, chemokine, receptor, neurotransmitter, antigen, allergen, antibody, substrate, metabolite, cofactor, inhibitor, drug, pharmaceutical, nutrient, prion, biohazardous agent, infectious agent, prion, vitamin, carcinogen, mutagen, and the like), chemical functional group (e.g., an alkane, thiol, alcohol, silane, alkene, carboxylate, ether, ester, amine, imine, aldehyde, ketone, alkyne, aromatic, heterocyclic aromatic, catalysts, ligands, and the like), and the like.

Fifth layer 68 includes actuator (e.g., 40, 140, 142, 150, and the like). Fifth layer 68 is disposed on fourth layer 66 and includes, e.g., a conductive material. Exemplary conductive materials such as a metal (e.g., the first metal or the second metal) and the like. The conductive material includes a transition metal, alkaline earth metal, alkali metal, rare earth metal, metal carbide, metal oxide, metal sulfide, non-metals (e.g., graphene, carbon nanotubes, carbon black, and the like), or a combination thereof. Exemplary metals include Zr, Hf, Ti, V, Cr, Mn, Fe, Co, Ni, Cu, Zn, Nb, Mo, Tc, Ru, Rh, Pd, Ag, Cd, Ta, W, Re, Os, Ir, Pt, Au, Li, Na, K, Be, Mg, Ca, Sr, Ba, Gd, and the like.

Figure 30A:
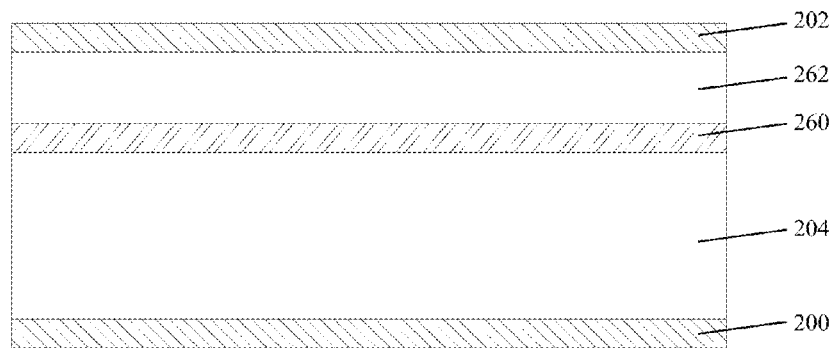
FIGS. 30A, 30B, 30C, 30D, 30E, 30F, 30G, 30H, 30I show formation of a microscope probe.

The microscope probe can be made in various ways, including a microfabrication or nanofabrication process. In an embodiment, and with reference to FIGS. 30A, 30B, 30C, 30D, 30E, 30F, 30G, 30H, and 30I, microscope probe 2 is formed by providing a layered structure that includes (see FIG. 30A), e.g., base layer 200 and top layer 202. Base layer 200 and top layer 202 can be a semiconductor material such as silicon nitride, specifically produced, e.g., produce by low pressure chemical vapor deposition (LPCVD). Base layer 200 and top layer 202 provides protection as well as ease of manipulation while being compositionally uniform. In some embodiments, base layer 200 and top layer 202 are resistant to chemical agents such as bases (e.g., potassium hydroxide (KOH)) or etchants (e.g., hydrogen fluoride (HF)). Disposed on base layer 200 is substrate layer 204. Substrate layer 204 can be a semiconductor material such as a silicon-on-insulator wafer (SOI). In an embodiment, substrate 204 is a handle wafer having a thickness of, e.g., 500 µm. Oxide layer 260 is disposed on substrate layer 204 and can have a thickness of, e.g., 1 µm. Disposed on oxide layer 260 is device layer 262, which can be, e.g., a semiconductor material having a thickness from, e.g., 0.25 µm to 5 µm.

Figure 30B:
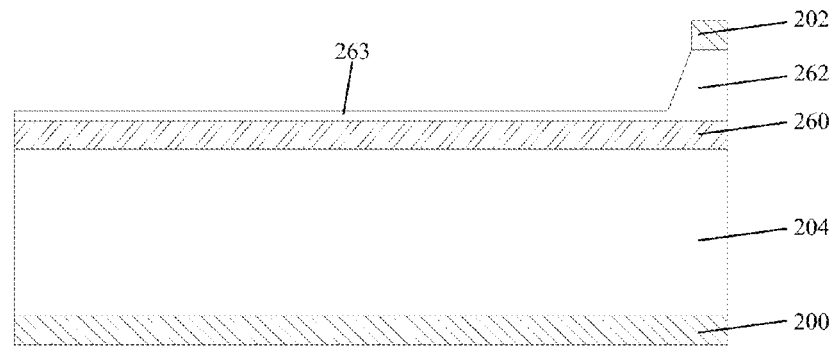

With reference to FIG. 30B, top layer 202 is subjected to dry etching, and device layer 262 is etched with, e.g., KOH to produce, optic layer 263 having a thickness of, e.g., 250 nm.

Figure 30C:
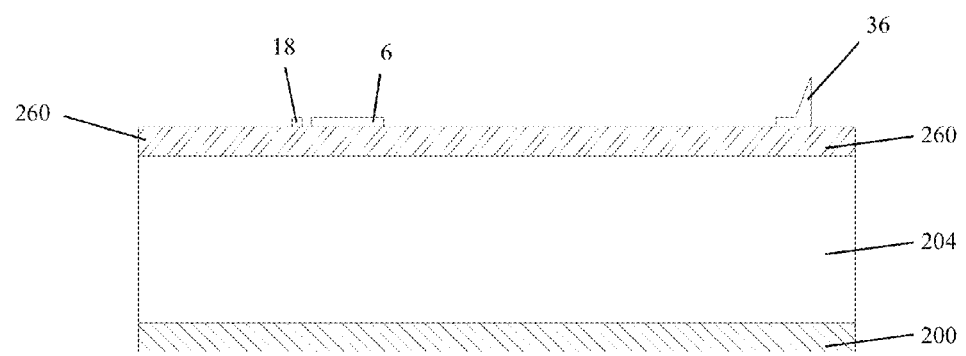

With reference to FIG. 30C, top layer 202 is removed, and optic layer 263 is subjected electron beam lithography (alternatively, a suitable optical lithography technique with suitably high resolution, e.g. to create features below 300 nm) and deep silicon etching to form waveguide 18, optical resonator 6, and tip 36. In some embodiments, with reference to FIG. 30C, waveguide 18 and optical resonator 6 are formed by electron beam lithography and deep silicon etching, while tip 36 is defined via photolithography and deep silicon etching. According to an embodiment, waveguide 18 and optical resonator 6 are formed by electron beam lithography and deep silicon etching, and a photo resist is applied to protect waveguide 18 and optical resonator 6 so that tip 36 can be formed in another optical lithography and deep silicon etching. In an alternative embodiment, all or part of displacement member 8 is formed out of layer 263.

Figure 30D:
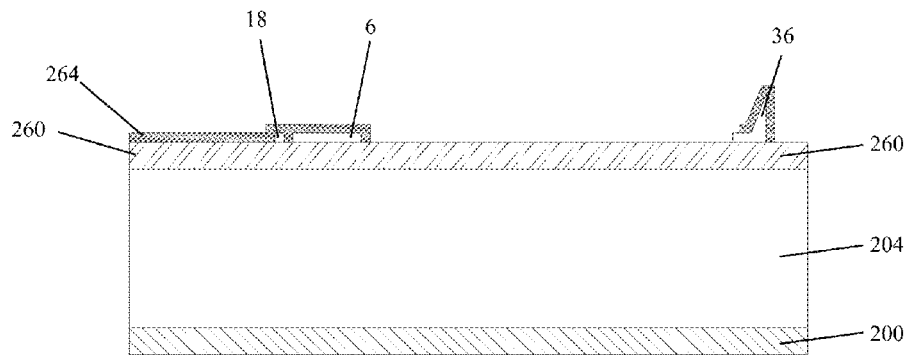

With reference to FIG. 30D, oxide layer 264 is formed on a portion of oxide layer 260 and also on waveguide 18, optical resonator 6, and tip 36 by disposing LPCVD oxide thereon. Oxide layer 264 is compositionally uniform and substantially without defects. Thereafter, oxide layer 264 is annealed and subjected to optical photolithography and dry etching at optical resonator 6 and tip 36.

Figure 30E:
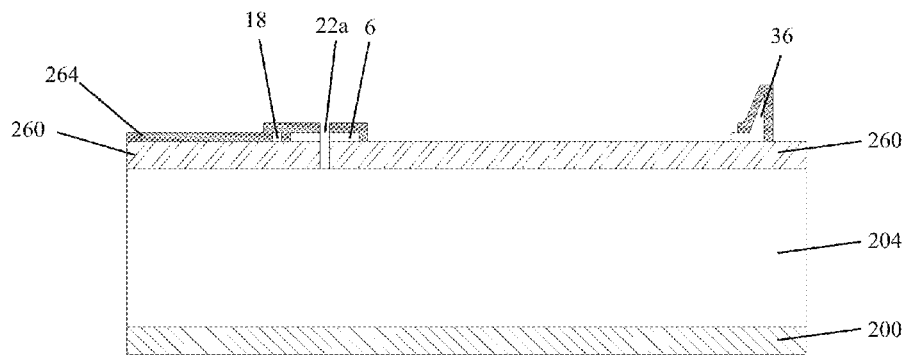

With reference to FIG. 30E, stub hole 22a made by etching a portion of oxide layer 264, optical resonator 6, and oxide layer 260.

Figure 30F:
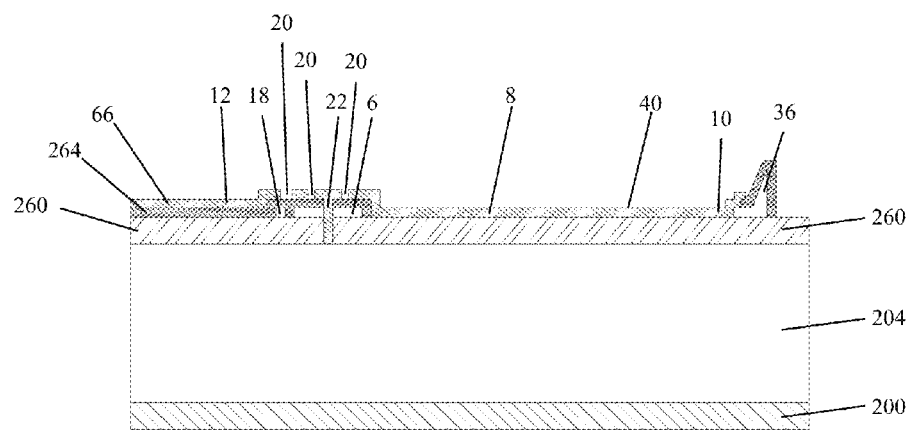

With reference to FIG. 30F, a nitride, e.g., silicon nitride, is deposited on the oxide layer 264, in stub hole 22a, oxide layer 260, and portions of tip 36 by, e.g., LPCVD. The silicon nitride is subjected to optical lithography and then dry etching to form fourth layer 66, stub 22, displacement member 8, and aperture 20.

Figure 30G:
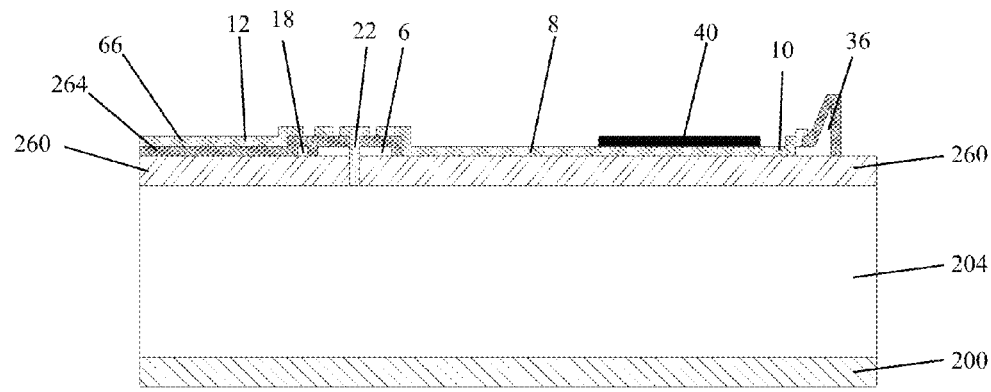

With reference to FIG. 30G, a conductive layer (e.g., chromium/gold) is disposed, e.g., deposited) on fourth layer 64 and subjected to optical lithography and ion milling to form actuator 40.

Optionally, various holes or apertures are created in substrate 4, oxide layers (260, 264), fourth layer 66, and the like by optical lithography or dry etching that can include application of a hard mask. Moreover, KOH can be used to etch various features such as V-shaped grooves in substrate 5 via such holes or apertures. In an embodiment, resulting V-grooves are used for attaching, e.g., fiber optical elements to microscope probe 2.

Figure 30H:
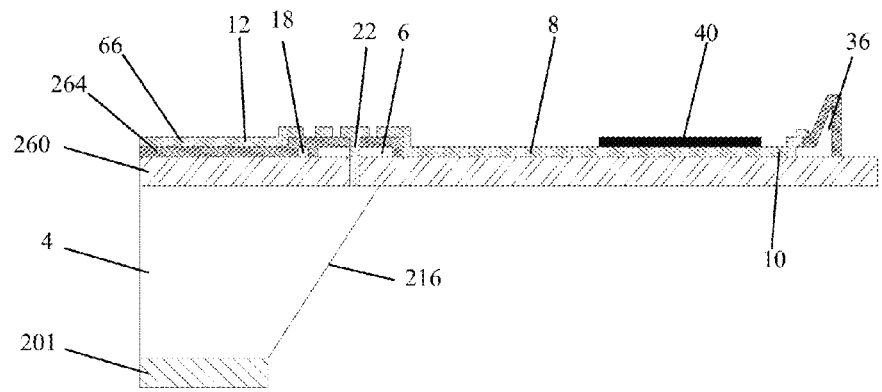

With reference to FIG. 30H, base layer 200 is subjected to optical lithography and dry etching to form layer 201, and substrate 204 is etched with, e.g., KOH to form substrate 4 having, e.g, under cut 216.

Figure 30I:
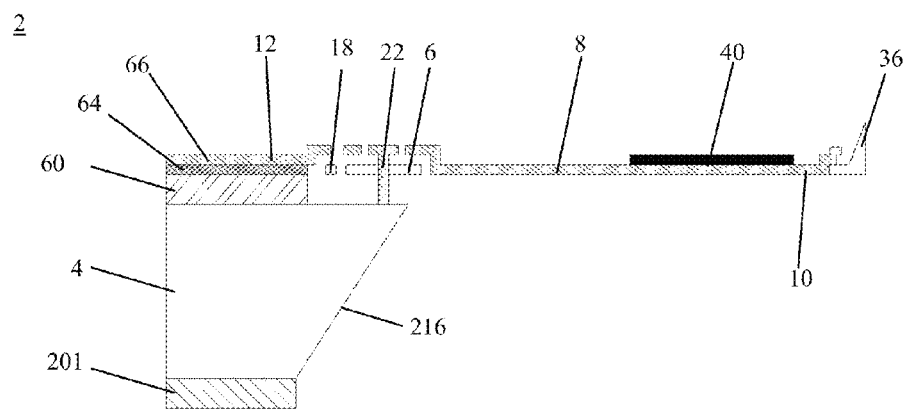

With reference to FIG. 30I, displacement member 8 and optical resonator 6 are released from oxide layer 260 using HF etching, and oxide layer 260 proximate to tip 36 and optical resonator 6 are removed. Additionally, a portion of oxide layer 260 proximate to waveguide 18 is removed to form microscope probe 2.

The microscope probe is scalable and can have a variety of dimensions or sizes formed, e.g., by microfabrication or nanofabrication processing. Although tip 36 has been shown as being disposed on a surface of displacement member 8 that faces away from optical resonator 6, tip 36 can be disposed on a surface of displacement member 8 opposing optical resonator 6. Further, in an embodiment, instead of projecting in a direction orthogonal to a plane defined by displacement member 8, tip 36 can project in the plane of displacement member 8. Tip 36 can have a length from 1 nm to 500 nm and a point that is on the order of a few angstroms to several nanometers.

In an embodiment, a distance between waveguide 18 and optical resonator 6 can be less than 800 nm, specifically from 2 nm to 800 nm, and more specifically from 100 nm to 500 nm. A thickness of optical resonator 6 can be based on a thickness of third layer 64, particularly on an order of a few nanometers to micrometers, e.g., 10 nm to 50 µm. A diameter of optical resonator (e.g., for a ring resonator, disc resonator, spherical resonator, and the like) can be any size effective to form a resonance for electromagnetic waves having a wavelength from a vacuum ultraviolet to microwave region of the electromagnetic spectrum, specifically from 30 nm to 100 GHz, more specifically from 250 nm to 1064 µm, and yet more specifically from 400 nm to 800 nm. Moreover, microscope probe 2 can include a large range of motion or vibrational oscillation of displacement member 8. Displacement member 8 can be displaced in space up to any distance such that displacement member 8 can return to an equilibrium position without permanent deformation. In some embodiments, displacement member can be displaced greater than 100 nm, specifically from 0 nm to 20 nm. Moreover, displacement member 8 can be subjected to modulation over a broad from, e.g., 0 Hz to 1 GHz.

The microscope probe has advantageous properties, including being a microscale mechanical transducer and having a geometry for AFM scanning with integrated optical sensing of displacement due to a condition of a sample. Additionally, the displacement member can be mechanically excited and selectively tuned. As such, the microscope probe has a high bandwidth and high sensitivity near quantum limit in a small size scanning configuration that can be economically made using, e.g., microelectromechanical system (MEMS) fabrication techniques. Integrating optomechanical transduction in the microscope probe provides high precision or stability. The microscope probe has a sensitivity greater than $10^{-10}$ m/Hz$^{1/2}$, specifically greater than $10^{-12}$ m/Hz$^{1/2}$, more specifically greater than $10^{-14}$ m/Hz$^{1/2}$, further more specifically greater $10^{-16}$ m/Hz$^{1/2}$.

The microscope probe 16 is sensitive to condition of the sample that include, e.g., electron density, surface corrugation, surface stiffness, electrical conductivity, magnetic force, topography, atomic arrangement, surface defect, mechanical contact force, van der Waals force, capillary force, chemical bonding, electrostatic force, Casimir force, solvation force, or a combination thereof. A construction and arrangement of the microscope probe can be varied and adapted for various geometries and uses. In an embodiment, the waveguide is configured to receive an electromagnetic wave and to transmit the electromagnetic wave (having, e.g., a first EM field) to the optical resonator. The waveguide can include, e.g., an optical fiber, a Bragg grating, or a combination thereof. The actuator is configured to change a mechanical property of the displacement member in response to application of a stimulus to the actuator, and the actuator can be a bimorphic member, an electrostatic member, or a combination thereof. The stimulus includes thermal activation (e.g., by passing electrical current through the actuator), electrical activation (e.g., biasing the actuator at a potential), or a combination thereof. The mechanical property can include a shape of the displacement member, an oscillation frequency of the displacement member, or a combination thereof.

With regard to the optical resonator, exemplary optical resonators include a hemispherical resonator, microdisk resonator, a microsphere resonator, a photonic array, a ring resonator, spheroidal resonator, near-spheroidal resonator, oblate or prolate spheroidal resonator, oval resonator, ovoid resonator, racetrack resonator, ellipsoidal resonator, polygonal resonator, polyhedral resonator, cylindrical resonator, fiber ring resonator, and the like. The optical resonator is configured to vary the first EM field of the electromagnetic wave to a second EM field in response to the change of its optical resonance property and to transmit the electromagnetic wave comprising the second electromagnetic field to the waveguide.

The microscope probe further provides stable and precise acquisition of signals, e.g., second EM field or first EM field, with direct actuation of the displacement member to provide reduction of thermal motion of the tip or back action on a sample. Moreover, the tip or displacement member can be controlled using feedback control.

The microscope probe is useful in numerous applications, including articles and processes. According to an embodiment, a microscope includes a microscope probe that includes a substrate, an optical resonator disposed on the substrate and comprising an optical resonance property, a displacement member disposed on the substrate and separated from the optical resonator. The displacement member includes a first end disposed distal to the optical resonator and a second end disposed proximate to the optical resonator. The microscope further includes a coupling member disposed on the substrate and connecting the displacement member to the substrate. The first end is configured to probe a sample and to be displaced in response to a condition of the sample, and the displacement member is configured to communicate displacement of the first end to the second end. Further, the second end is configured to change the optical resonance property in response to displacement of the second end. The microscope also includes a waveguide disposed proximate to the optical resonator to receive an electromagnetic wave comprising a first electromagnetic field and to transmit the electromagnetic wave to the optical resonator, the optical resonator being configured to vary the first electromagnetic field to a second electromagnetic field in response to the change of the optical resonance property and to transmit the electromagnetic wave comprising the second electromagnetic field to the waveguide. An actuator is disposed on the displacement member to change a mechanical property of the displacement member in response to application of a stimulus to the actuator, and a detector is included in the microscope to detect the second electromagnetic field. In this manner, integration of the actuator and optical resonator in the microscope allows, e.g., parallelization of a plurality of microscope probes. As such, it is contemplated that an apparatus includes a plurality of microscope probes for high through put measuring applications.

The microscope probe also allows for efficient acquisition of the surface condition. In an embodiment, a process for acquiring a condition of a sample includes transmitting an electromagnetic wave including a first electromagnetic field from a waveguide to an optical resonator disposed on a substrate, the optical resonator comprising an optical resonance property and disposing a displacement member proximate to a sample, the displacement member being disposed on the substrate and separated from the optical resonator. The displacement member includes a first end disposed distal to the optical resonator and a second end disposed proximate to the optical resonator. The process further includes probing a sample with the first end, displacing the first end in response to a condition of the sample, communicating displacement of the first end to the second end, changing the optical resonance property in response to displacement of the second end, varying the first electromagnetic field to a second electromagnetic field in response to the change of the optical resonance property, and transmitting the electromagnetic wave comprising the second electromagnetic field to the waveguide to acquire the condition of the sample. Additionally, the process includes applying a stimulus to an actuator disposed on the displacement member and changing a mechanical property of the displacement member in response to applying the stimulus; detecting the second electromagnetic field and determining the condition from the second electromagnetic field; or a combination comprising at least one of the foregoing. The condition includes, e.g., an electron density, surface corrugation, surface stiffness, electrical conductivity, magnetic force, topography, atomic arrangement, surface defect, mechanical contact force, van der Waals force, capillary force, chemical bonding, electrostatic force, Casimir force, solvation force, or a combination thereof.

Figure 31:
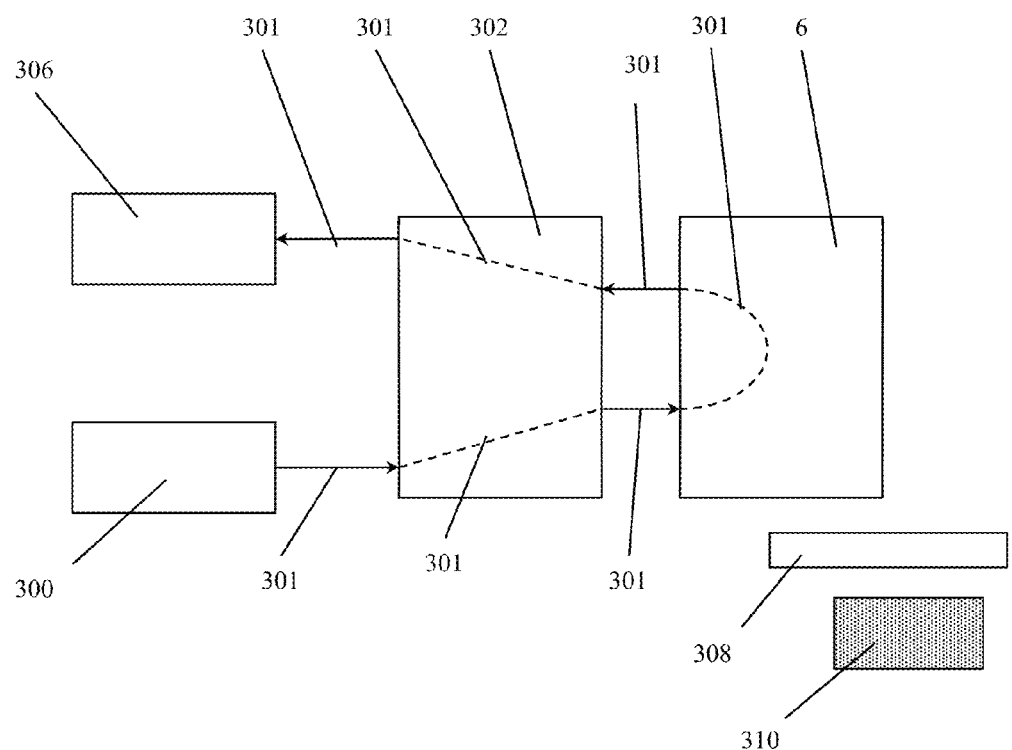
FIG. 31 shows a block diagram of a microscope.

According to an embodiment, as shown in FIG. 31, a system for microscopy includes a light source 300 to transmit an electromagnetic wave along path 301 to as input to waveguide 302, which transmits the electromagnetic wave having to optical resonator 304. Optical resonator 304 transmits the electromagnetic wave to waveguide 302 for subsequent transmission of the electromagnetic wave to detector 306. The transmission of the EM field of the electromagnetic wave varies based on a separation between optical resonator 304 and displacement member 308, which interacts with sample 310. The light source can be a CW or pulsed laser, lamp, diode, and the like.

Figure 32A:
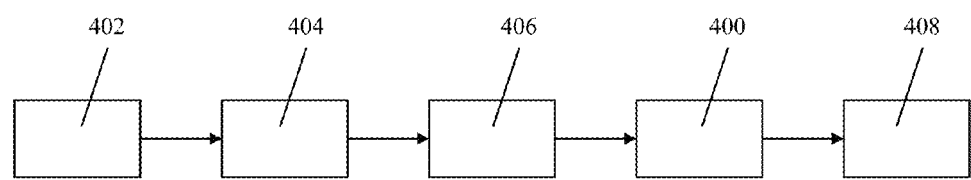
FIGS. 32A and 32B respectively show block diagrams for an optical setup (FIG. 32A) and an optical and electrical setup (FIG. 32B)
Figure 32B:
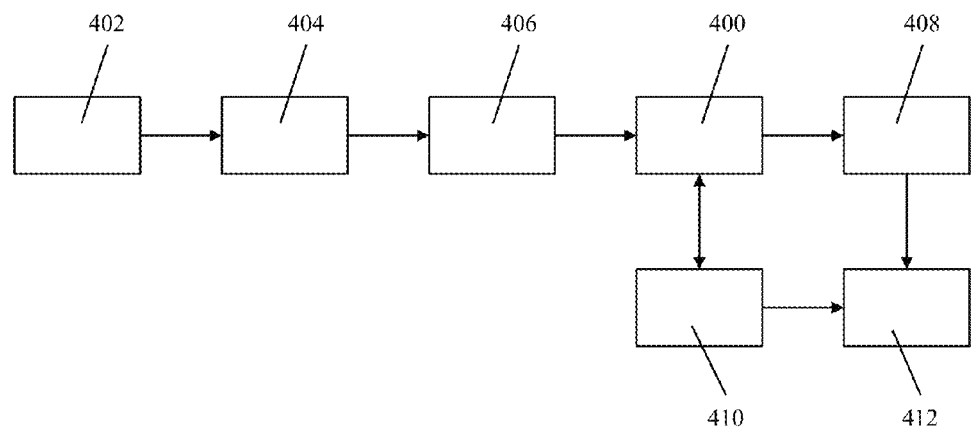

In an embodiment, as shown in FIG. 32A, microscope 400 is configured with the microscope probe attached to a holder, and the tip is disposed proximate to a sample for probing the sample. Output from a tunable laser 402 (e.g., from 1520 nm to 1570 nm) is passed through polarization controller 404 and attenuator 406 before being transmitted to the microscope probe and detected by a detector 408 (e.g., photodiode). In another embodiment, as shown in FIG. 32B, microscope 400 is configured with the microscope probe attached to a holder, and the tip is disposed proximate to a sample for probing the sample. Output from a tunable laser 402 is passed through polarization controller 404 and attenuator 406 before being transmitted to the microscope probe. The actuator is controlled by a waveform generated from function generator 410, and the waveform is also used a referenced for phase sensitive detector 412 (e.g., a lock-in amplifier). The electromagnetic wave transmitted by the optical resonator is transmitted to detector 408, and the output of detector 408 is received by phase sensitive detector 412. Analysis of the detected signal provides the condition of the sample.

Figure 34:
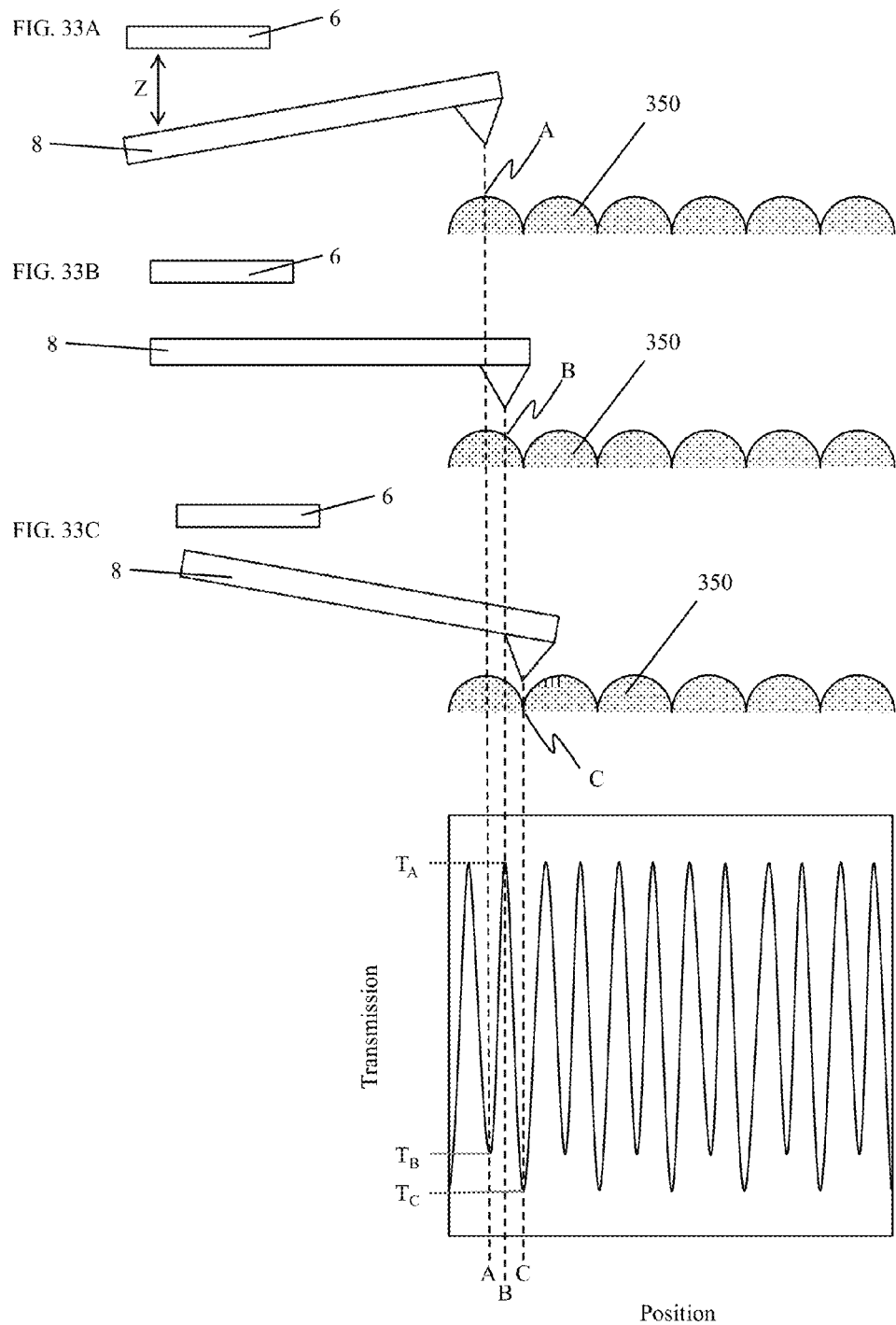
FIG. 34 shows a graph of transmission versus position corresponding to the deflection of the displacement member shown in FIGS. 33A, 33B, and 33C.

As depicted in FIGS. 33A, 33B, and 33C, as displacement member 8 is scanned across a surface (e.g., having atoms 350), a distance Z varies between displacement member 8 and optical resonator 6. As shown respectively in FIGS. 33A, 33B, and 33C, tip 36 is proximate to position A of atom 350, position B, and position C. here, transmission of an electromagnetic wave is greatest at position B, but less at positions B and C. As a result, as displacement member 8 is scanned over surface atoms 350, transmission of the electromagnetic wave to the detector will change as the EM field is varied by optical resonator due to changes in distance Z. Accordingly, FIG. 34 shows detected transmission of the EM wave by optical resonator 6 as a function of position of tip 36. $T_A$ indicates transmission at position A; $T_B$ indicates transmission at position A, and $T_C$ indicates transmission at position C.

Figure 35A:
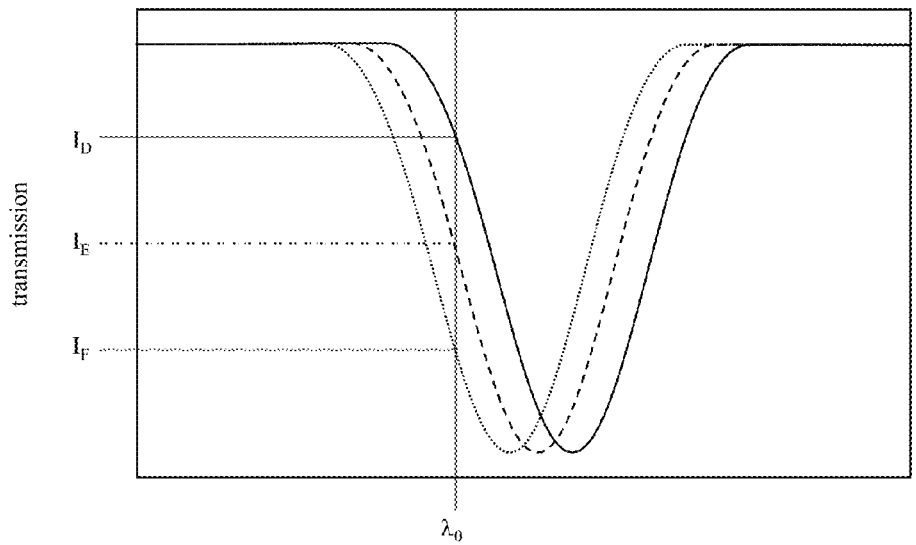
FIG. 35A shows a graph of transmission versus wave primary wavelength for an optical resonator.
Figure 35B:
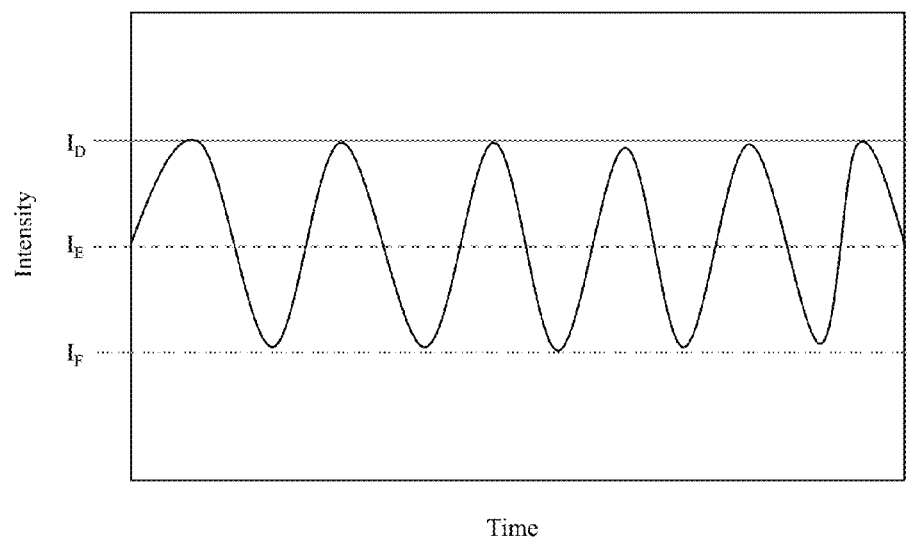
FIG. 35B shows a graph of intensity versus time for an output signal of a microscope probe.

In an embodiment of a microscope, a laser outputs light to the waveguide and optical resonator, and the frequency of the light is on-resonance with the optical resonator at primary wavelength $\lambda_0$ when the displacement member is at an equilibrium position. The displacement member is displaced so that transmission of the light from the optical resonator varies at the detector. Transmission curves of the optical resonator as a function of three displacement positions (D, E, F) of the displacement member relative to the optical resonator are shown in FIG. 35A. Here, the transmission value for the light at positions D, E, and F are respectively shown as $I_D$, $I_E$, and $I_F$. Accordingly, actuating the displacement member at a frequency f and detecting light of primary wavelength $\lambda_0$ varies in time as shown in FIG. 35B.

Figure 36A:
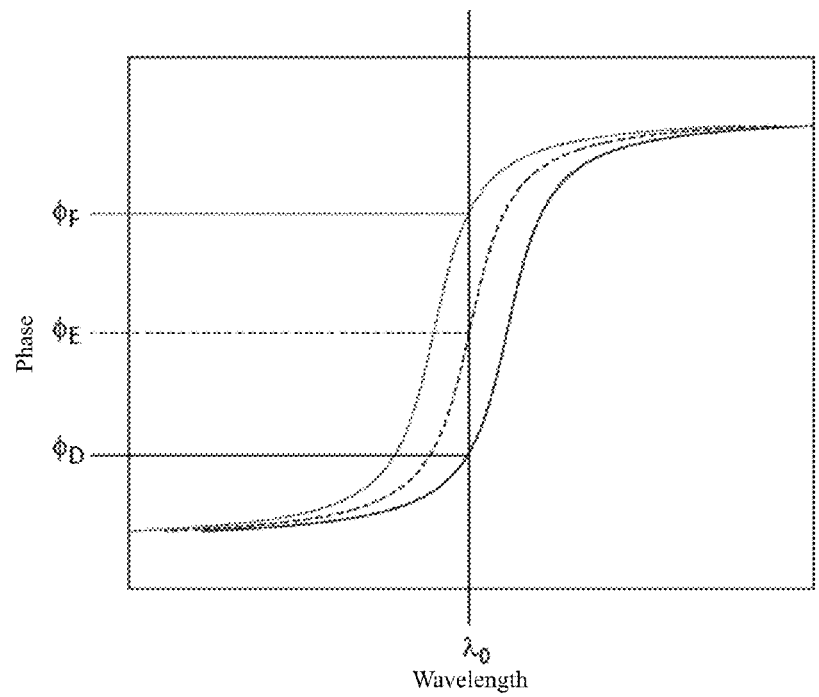
FIG. 36A shows a graph of phase versus wave primary wavelength for an optical resonator.
Figure 36B:
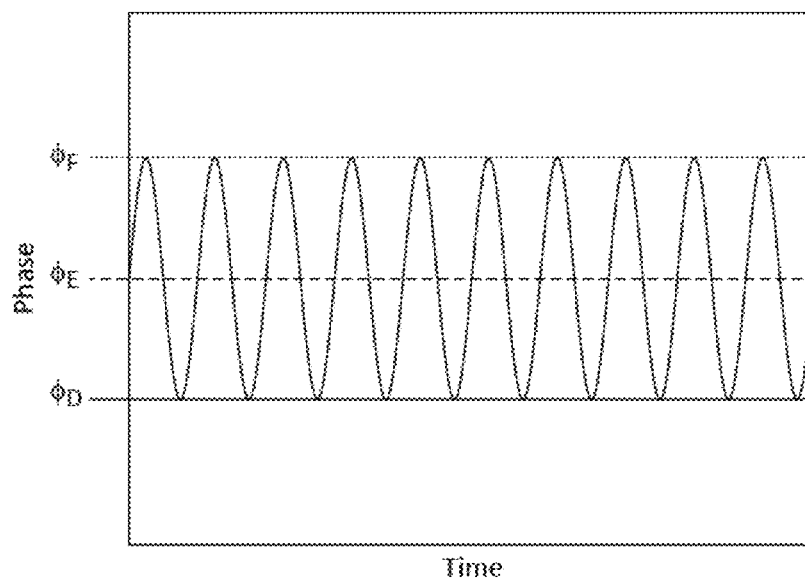
FIG. 36B shows a graph of phase versus time for an output signal of a microscope probe.

With reference to FIG. 36A, B, a phase of the EM field of light transmitted by the optical resonator is determined as well. The phase can be measured using an optical homodyne configuration wherein the light from the laser is split into two portions. A first portion of light sent through the microscope probe, and a second portion being a local oscillator. Light transmitted by the microscope probe interferes with the local oscillator at an interference element (e.g., an optical beam splitter or a fiber coupler). A polarization in the first portion and second portion is controlled so light from the microscope probe and local oscillator are co-polarized before being present at the interference element. An interference signal results and is proportional to an amplitude of an electric field of each portion and a cosine of a phase difference between them. FIG. 36A shows a phase response versus input laser wavelength, and the indicated primary wavelength $\mu_0$ is when the input laser is on-resonance with the optical resonator. A displacement of the displacement member causes the phase response to shift along the wavelength axis so that when the laser is fixed at the primary wavelength $\lambda_0$, the phase response changes in time as shown in FIG. 36B.

Figure 37:
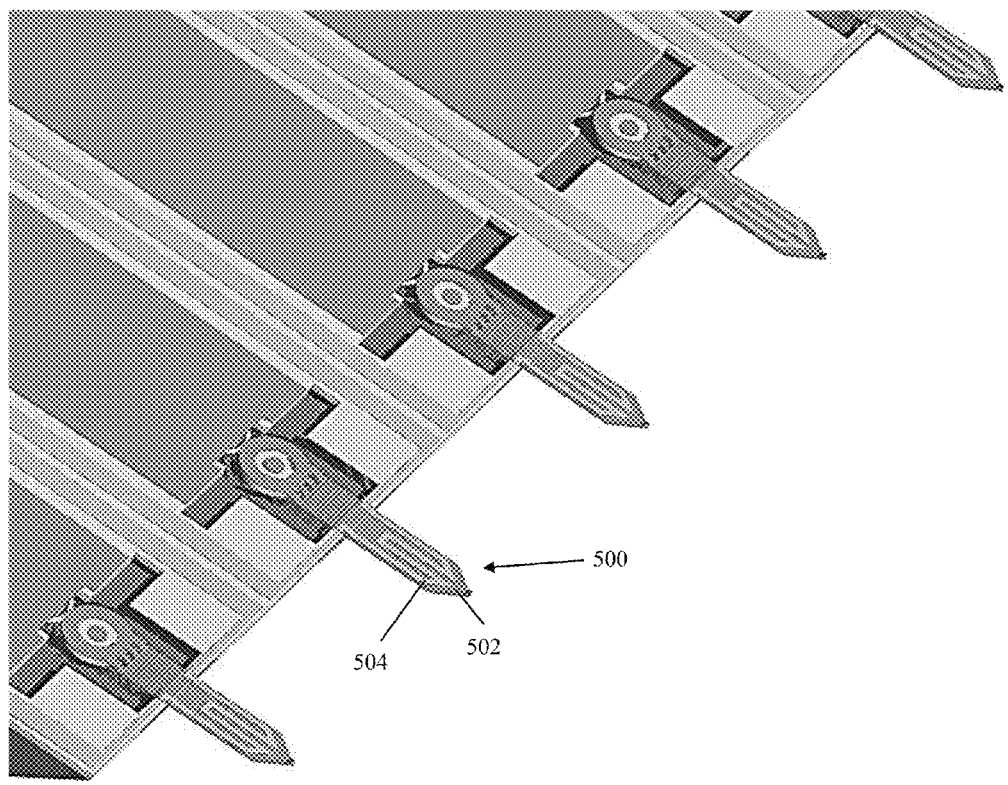
FIG. 37 shows an array of microscope probes.

According to an embodiment, an apparatus includes a plurality of microscope probes for high through put measuring applications as shown in FIG. 37. Here, a plurality of microscope probes 500 are formed on a substrate and connected to a controller (not shown) for driving actuator 502 disposed on displacement member 504.

The apparatus and process herein are further illustrated by the following examples, which are non-limiting.

EXAMPLES

Example 1

Figure 38:
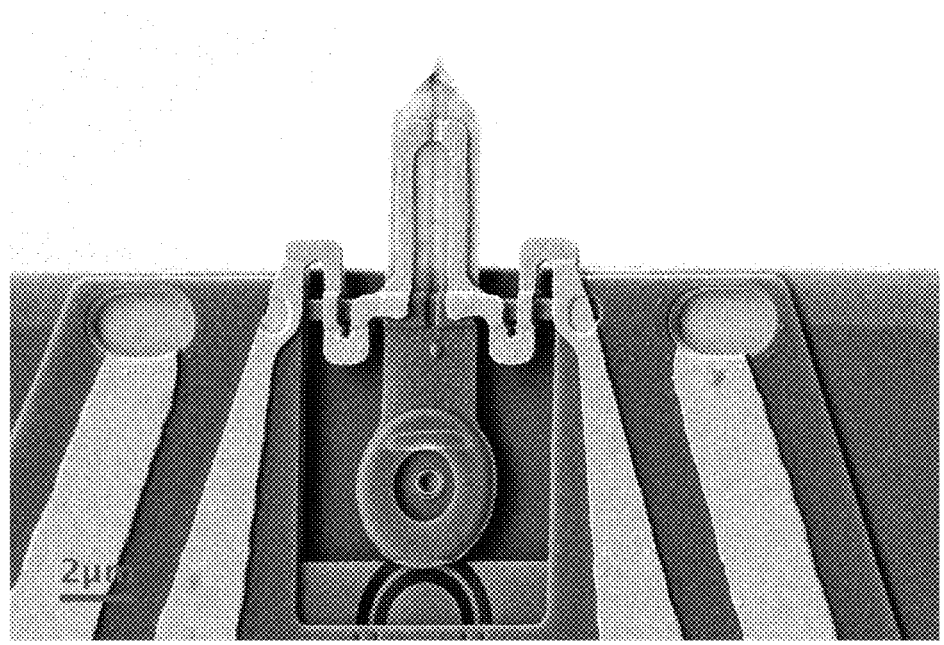
FIG. 38 shows a micrograph of a microscope probe according to Example 1.

A microscope probe was formed using the process described above. A scanning electron microscope micrograph of the microscope probe is shown in FIG. 38.

Example 2

Figure 39:
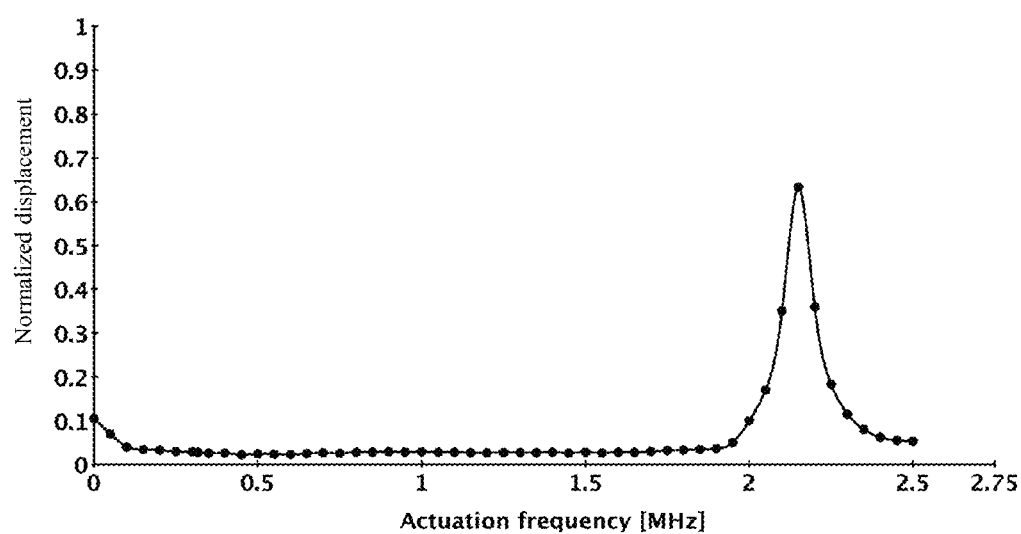
FIG. 39 shows a graph of deflection (in Volts) versus actuation frequency (in megahertz) for actuation of a displacement member for the microscope probe shown in FIG. 38.

The microscope probe of Example 2 was subjected to actuation of the actuator to displace the displacement member. The resulting normalized displacement of the displacement member is shown in FIG. 39, with a maximum signal that corresponds to a displacement of about 3 nm.

Example 3

Optical properties of optical resonator.

Figure 40A:
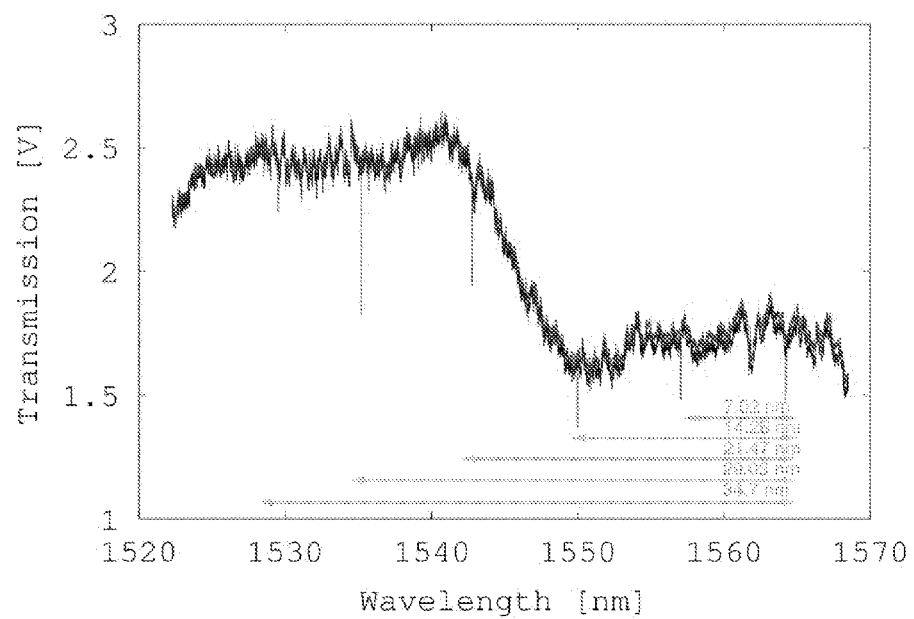
FIG. 40A shows a graph of transmission versus wavelength for a spectrum of transverse electric (TE) mode polarized light acquired as an output signal from the optical resonator of the microscope probe shown in FIG. 38.
Figure 40B:
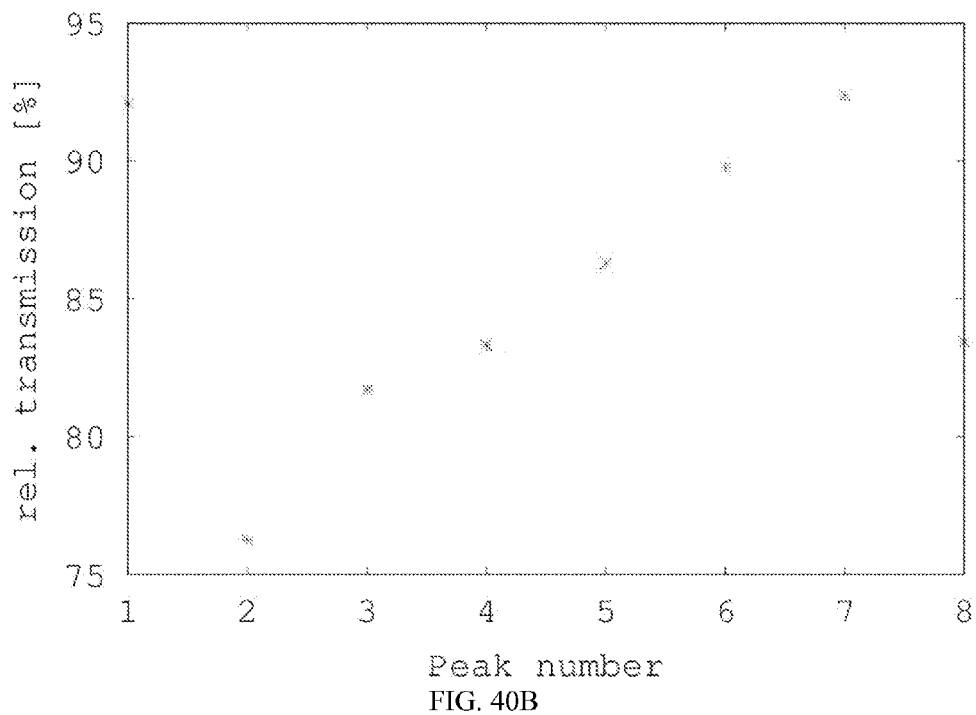
FIG. 40B shows a graph of relative transmission versus peak number corresponding to the spectrum shown in FIG. 40A.
Figure 40C:
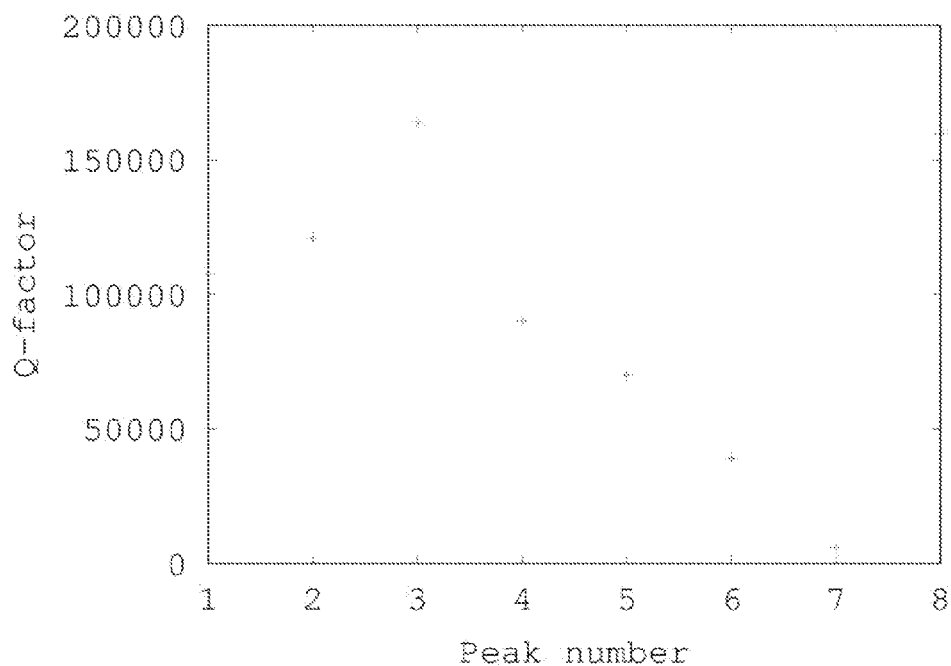
FIG. 40C shows a graph of quality (Q) factor versus peak number corresponding to the spectrum shown in FIG. 40A.
Figure 40D:
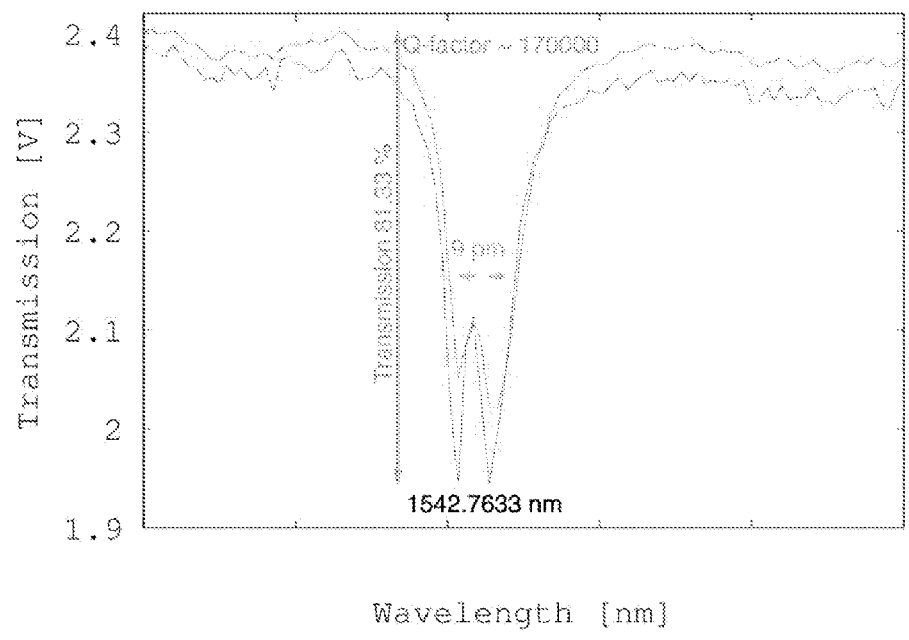
FIG. 40D shows a graph of transmission versus wavelength for Peak 2 of the spectrum shown in FIG. 40A.

The optical resonator was subjected to light from a laser and transmitted light from the optical resonator was detector. The spectrum for transmission of transverse electric (TE) mode polarized light was acquired. FIG. 40A shows a graph of transmission versus wavelength for a spectrum of TE mode polarized light acquired as an output signal from the optical resonator of the microscope probe shown in FIG. 38. FIG. 40B shows a graph of relative transmission versus peak number corresponding to the spectrum shown in FIG. 40A. FIG. 40C shows a graph of quality (Q) factor versus peak number corresponding to the spectrum shown in FIG. 40A. FIG. 40D shows a graph of transmission versus wavelength for Peak 2 of the spectrum shown in FIG. 40A.

Figure 41A:
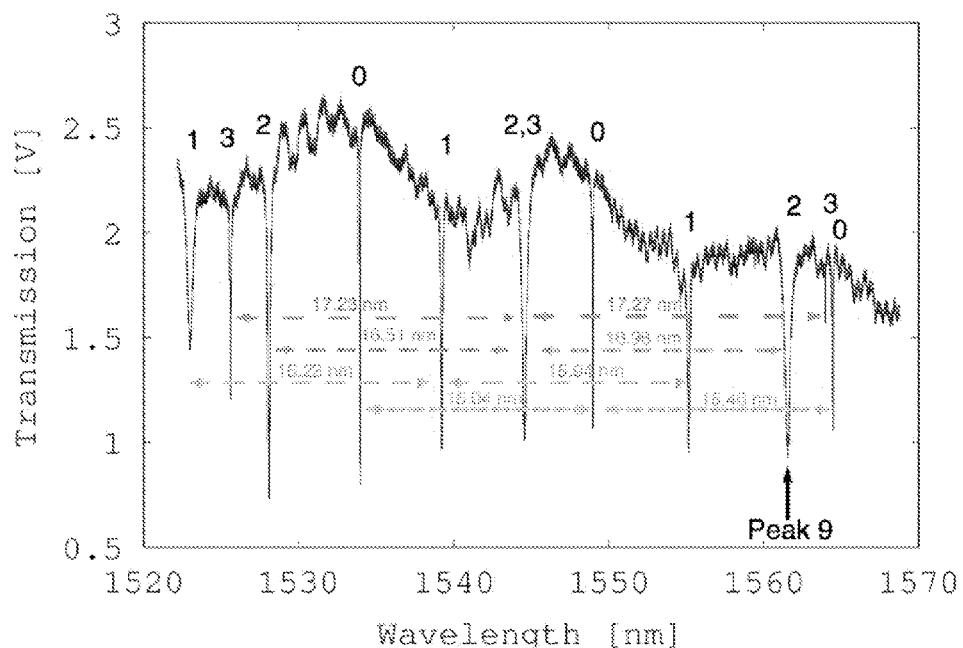
FIG. 41A shows a graph of transmission versus wavelength for a spectrum of transverse magnetic (TM) mode polarized light acquired as an output signal from the optical resonator of the microscope probe shown in FIG. 38.
Figure 41B:
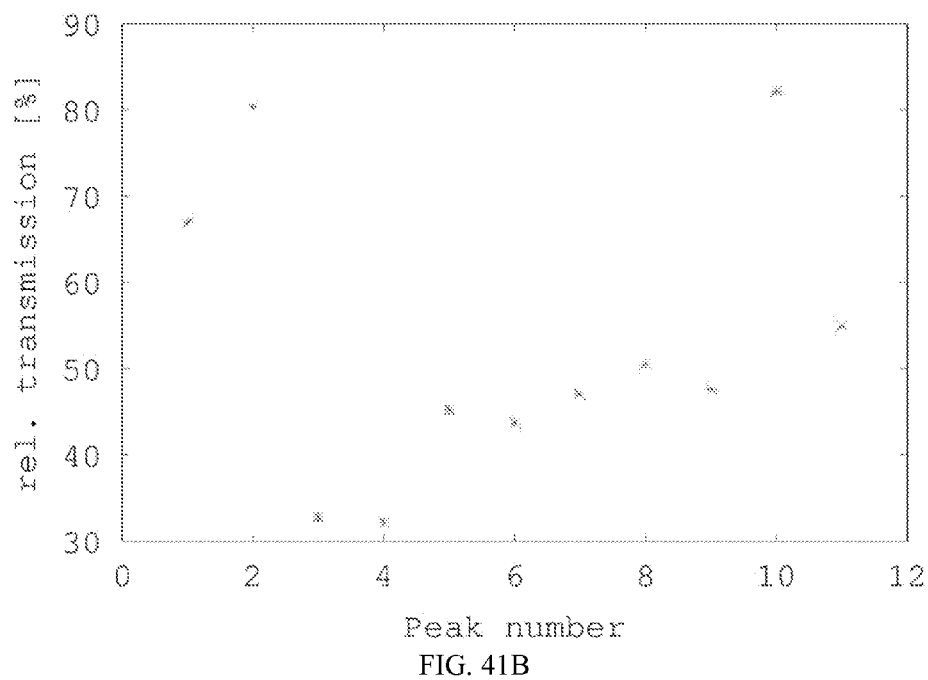
FIG. 41B shows a graph of relative transmission versus peak number corresponding to the spectrum shown in FIG. 41A.
Figure 41C:
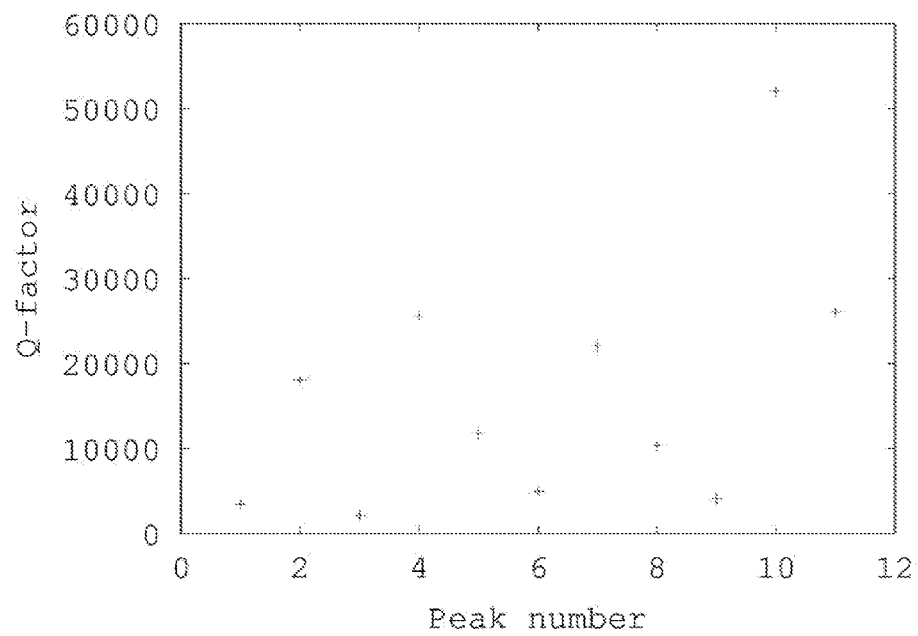
FIG. 41C shows a graph of quality (Q) factor versus peak number corresponding to the spectrum shown in FIG. 41A.
Figure 41D:
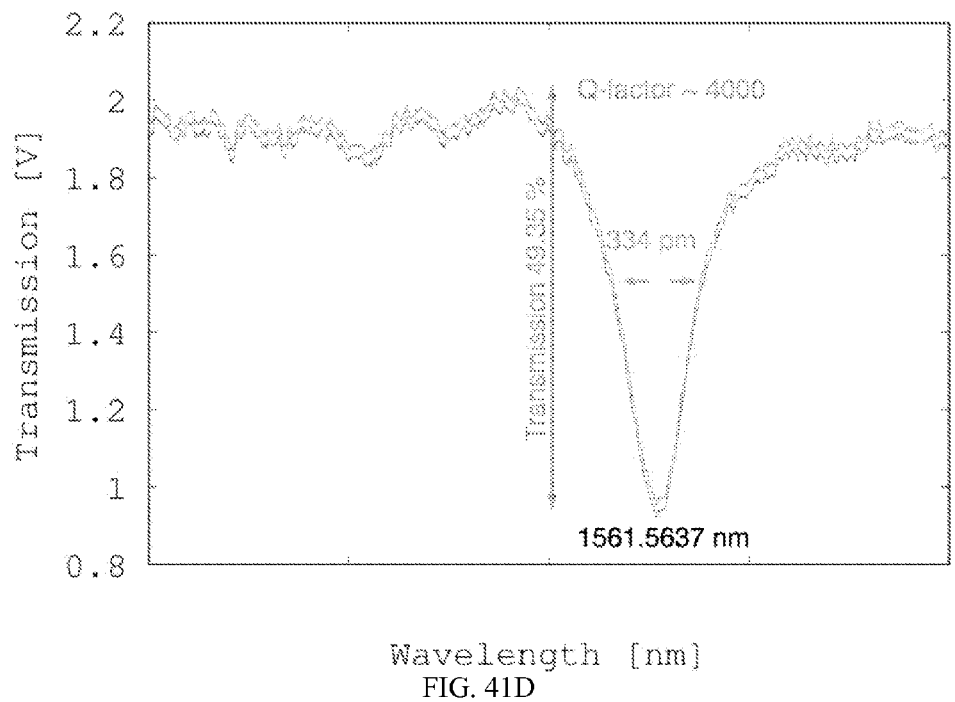
FIG. 41D shows a graph of transmission versus wavelength for Peak 9 of the spectrum shown in FIG. 41A.

The spectrum for transmission of transverse magnetic (TM) mode polarized light was acquired. FIG. 41A shows a graph of transmission versus wavelength for a spectrum of transverse magnetic (TM) mode polarized light acquired as an output signal from the optical resonator of the microscope probe shown in FIG. 38. FIG. 41B shows a graph of relative transmission versus peak number corresponding to the spectrum shown in FIG. 41A. FIG. 41C shows a graph of Q factor versus peak number corresponding to the spectrum shown in FIG. 41A. FIG. 41D shows a graph of transmission versus wavelength for Peak 9 of the spectrum shown in FIG. 41A.

While one or more embodiments have been shown and described, modifications and substitutions may be made thereto without departing from the spirit and scope of the invention. Accordingly, it is to be understood that the present invention has been described by way of illustrations and not limitation. Embodiments herein can be used independently or can be combined.

All ranges disclosed herein are inclusive of the endpoints, and the endpoints are independently combinable with each other. The ranges are continuous and thus contain every value and subset thereof in the range. Unless otherwise stated or contextually inapplicable, all percentages, when expressing a quantity, are weight percentages. The suffix "(s)" as used herein is intended to include both the singular and the plural of the term that it modifies, thereby including at least one of that term (e.g., the colorant(s) includes at least one colorants). "Optional" or "optionally" means that the subsequently described event or circumstance can or cannot occur, and that the description includes instances where the event occurs and instances where it does not. As used herein, "combination" is inclusive of blends, mixtures, alloys, reaction products, and the like.

As used herein, "a combination thereof" refers to a combination comprising at least one of the named constituents, components, compounds, or elements, optionally together with one or more of the same class of constituents, components, compounds, or elements.

All references are incorporated herein by reference.

The use of the terms "a" and "an" and "the" and similar referents in the context of describing the invention (especially in the context of the following claims) are to be construed to cover both the singular and the plural, unless otherwise indicated herein or clearly contradicted by context. "Or" means "and/or." It should further be noted that the terms "first," "second," "primary," "secondary," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity). The conjunction "or" is used to link objects of a list or alternatives and is not disjunctive; rather the elements can be used separately or can be combined together under appropriate circumstances.

What is claimed is:

1. A microscope probe comprising:
   a substrate;
   an optical resonator disposed on the substrate and comprising an optical resonance property;
   a displacement member disposed on the substrate and separated from the optical resonator, the displacement member comprising:
   a first end disposed distal to the optical resonator; and
   a second end disposed proximate to the optical resonator; and
   a coupling member disposed on the substrate and connecting the displacement member to the substrate,
   wherein the first end is configured to probe a sample and to be displaced in response to a condition of the sample,
   the displacement member is configured to communicate displacement of the first end to the second end, and
   the second end is configured to change the optical resonance property in response to displacement of the second end.

2. The microscope probe of claim 1, further comprising a waveguide disposed proximate to the optical resonator to receive an electromagnetic wave and to transmit the electromagnetic wave to the optical resonator.

3. The microscope probe of claim 2, wherein the waveguide comprises an optical fiber, a Bragg grating, or a combination comprising at least one of the foregoing.

4. The microscope probe of claim 1, further comprising an actuator disposed on the displacement member to change a mechanical property of the displacement member in response to application of a stimulus to the actuator.

5. The microscope probe of claim 4, wherein the actuator comprises a bimorphic member, an electrostatic member, or a combination comprising at least one of the foregoing.

6. The microscope probe of claim 1, further comprising a probe tip disposed on the first end,
   wherein the probe tip protrudes from a surface of the first end.

7. The microscope probe of claim 6, further comprising a functional group disposed on the probe tip.

8. The microscope probe of claim 1, further comprising a stub disposed on the substrate,
   wherein the optical resonator is attached to the stub such that the optical resonator is separated by a distance from the substrate.

9. The microscope probe of claim 1, wherein the optical resonator is a hemispherical resonator, microdisk resonator, a microsphere resonator, a photonic array, a ring resonator, or a combination comprising at least one of the foregoing.

10. The microscope probe of claim 9, wherein the optical resonator is disposed between the substrate and the second end, and the optical resonator is stationary relative to the substrate.

11. The microscope probe of claim 1, wherein the coupling member connects to the displacement member at a position between the first end and the second end.

12. The microscope probe of claim 1, wherein the microscope probe is an atomic force microscope probe.

13. The microscope probe of claim 3, wherein the electromagnetic wave comprises a first electromagnetic field, and the optical resonator is configured to vary the first electromagnetic field to a second electromagnetic field in response to the change of the optical resonance property and to transmit the electromagnetic wave comprising the second electromagnetic field to the waveguide.

14. The microscope probe of claim 4, wherein the stimulus comprises thermal activation, electrical activation, or a combination comprising at least one of the foregoing.

15. The microscope probe of claim 14, wherein the mechanical property comprises a shape of the displacement member, an oscillation frequency of the displacement member, or a combination comprising at least one of the foregoing.

16. The microscope probe of claim 1, wherein the condition comprises electron density, surface corrugation, surface stiffness, electrical conductivity, magnetic force, topography, atomic arrangement, surface defect, mechanical contact force, van der Waals force, capillary force, chemical bonding, electrostatic force, Casimir force, solvation force, or a combination comprising at least one of the foregoing.

17. The microscope probe of claim 1, wherein the microscope probe has a displacement sensitivity greater than $10^{-16}$ m/Hz$^{1/2}$.

18. A microscope comprising:
a microscope probe comprising:
  a substrate;
  an optical resonator disposed on the substrate and comprising an optical resonance property;
  a displacement member disposed on the substrate and separated from the optical resonator, the displacement member comprising:
    a first end disposed distal to the optical resonator; and
    a second end disposed proximate to the optical resonator;
  a coupling member disposed on the substrate and connecting the displacement member to the substrate,
  wherein the first end is configured to probe a sample and to be displaced in response to a condition of the sample,
  the displacement member is configured to communicate displacement of the first end to the second end, and
  the second end is configured to change the optical resonance property in response to displacement of the second end;
a waveguide disposed proximate to the optical resonator to receive an electromagnetic wave comprising a first electromagnetic field and to transmit the electromagnetic wave to the optical resonator, the optical resonator being configured to vary the first electromagnetic field to a second electromagnetic field in response to the change of the optical resonance property and to transmit the electromagnetic wave comprising the second electromagnetic field to the waveguide; and
an actuator disposed on the displacement member to change a mechanical property of the displacement member in response to application of a stimulus to the actuator; and
a detector to detect the second electromagnetic field.

19. A process for acquiring a condition of a sample, the process comprising:
transmitting an electromagnetic wave comprising a first electromagnetic field from a waveguide to an optical resonator disposed on a substrate, the optical resonator comprising an optical resonance property;
disposing a displacement member proximate to a sample, the displacement member being disposed on the substrate and separated from the optical resonator, the displacement member comprising:
  a first end disposed distal to the optical resonator; and
  a second end disposed proximate to the optical resonator;
probing a sample with the first end;
displacing the first end in response to a condition of the sample;
communicating displacement of the first end to the second end;
changing the optical resonance property in response to displacement of the second end;
varying the first electromagnetic field to a second electromagnetic field in response to the change of the optical resonance property; and
transmitting the electromagnetic wave comprising the second electromagnetic field to the waveguide to acquire the condition of the sample.

20. The process of claim 19, further comprising:
applying a stimulus to an actuator disposed on the displacement member and
changing a mechanical property of the displacement member in response to applying the stimulus;
detecting the second electromagnetic field and
determining the condition from the second electromagnetic field; or
a combination comprising at least one of the foregoing,
wherein the condition comprises electron density, surface corrugation, surface stiffness, electrical conductivity, magnetic force, topography, atomic arrangement, surface defect, mechanical contact force, van der Waals force, capillary force, chemical bonding, electrostatic force, Casimir force, solvation force, or a combination comprising at least one of the foregoing.

* * * * *